(12) United States Patent
Tobisawa et al.

(10) Patent No.: US 7,707,879 B2
(45) Date of Patent: May 4, 2010

(54) GEAR PAIR EVALUATION APPARATUS, GEAR PAIR EVALUATION PROGRAM, AND GEAR PAIR WHOSE TOOTH SURFACES ARE EVALUATED USING THE APPARATUS AND PROGRAM

(75) Inventors: Keiichiro Tobisawa, Tokyo (JP); Masaki Kano, Tokyo (JP); Kohei Saiki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 204 days.

(21) Appl. No.: 11/887,120

(22) PCT Filed: Apr. 13, 2006

(86) PCT No.: PCT/JP2006/307865

§ 371 (c)(1),
(2), (4) Date: Sep. 25, 2007

(87) PCT Pub. No.: WO2006/112369

PCT Pub. Date: Oct. 26, 2006

(65) Prior Publication Data

US 2009/0019927 A1    Jan. 22, 2009

(30) Foreign Application Priority Data

Apr. 15, 2005    (JP)    ............... 2005-118848

(51) Int. Cl.
*G01M 13/02*    (2006.01)
(52) U.S. Cl. ...................................... 73/162
(58) Field of Classification Search ............ 73/162; 702/33, 150, 152, 153, 167, 168
See application file for complete search history.

(56) References Cited

U.S. PATENT DOCUMENTS 4,276,700 A    7/1981    Tanno et al.

(Continued)

FOREIGN PATENT DOCUMENTS

EP    1 260 736    11/2002

(Continued)

OTHER PUBLICATIONS

Aizo Kubo et al., "On Simulation Methods of . . . Accuracy", The Japan Society of Mechanical Engineers Journal (C), vol. 62, No. 599, 1996-1997, Article No. 95-1547, pp. 2833-2841.

*Primary Examiner*—Hezron Williams
*Assistant Examiner*—Nathaniel Kolb
(74) *Attorney, Agent, or Firm*—Smith, Gambrell & Russell, LLP

(57) ABSTRACT

There is provided a gear pair evaluation apparatus capable of performing accurate tooth surface analysis based on actual tooth surface measurement information without using information about a reference tooth surface. A processing unit 6 associates three-dimensional coordinate data on a gear tooth surface 102G and three-dimensional coordinate data on a pinion tooth surface 102P with each other at a predetermined meshing rotational position and converts the three-dimensional coordinate data into three-dimensional coordinate data on a cylindrical coordinate system based on the gear 101G. The processing unit 6 generates functions representing points on the pinion tooth surface 102P on the basis of the three-dimensional coordinate data on the pinion tooth surface 102P and calculates the coordinates of points on the pinion tooth surface 102P that correspond to points (grid points) on the gear tooth surface 102G by using the functions.

19 Claims, 16 Drawing Sheets

U.S. PATENT DOCUMENTS

| | | | |
|---|---|---|---|
| 5,231,875 A | * | 8/1993 | Honda ........................ 73/162 |
| 5,511,414 A | * | 4/1996 | Nakamura et al. ............ 73/162 |
| 2003/0056371 A1 | | 3/2003 | Honda |

FOREIGN PATENT DOCUMENTS

| | | | |
|---|---|---|---|
| JP | 02-000649 B2 | | 1/1990 |
| JP | 9-53702 | | 2/1997 |
| JP | 2004-318608 | | 11/2004 |
| JP | 2005-69713 | | 3/2005 |
| JP | 2005195360 A | * | 7/2005 |
| JP | 3733908 | | 10/2005 |
| WO | 01/65148 | | 9/2001 |

* cited by examiner

GEAR PAIR EVALUATION APPARATUS, GEAR PAIR EVALUATION PROGRAM, AND GEAR PAIR WHOSE TOOTH SURFACES ARE EVALUATED USING THE APPARATUS AND PROGRAM

TECHNICAL FIELD

The present invention relates, in particular, to a gear pair evaluation apparatus and a gear pair evaluation program suitable for tooth contact analysis of gears such as bevel gears and hypoid gears, and to a gear pair whose tooth surfaces are evaluated by using the apparatus and the program.

BACKGROUND ART

Generally, the shape of tooth surfaces (actual tooth surface shape) of gears of gear pairs such as bevel gears and hypoid gears that are in practical use is not a theoretically conjugate and mathematically expressed tooth surface shape but a machinable, approximate tooth surface shape. Accordingly, it is important to perform evaluation of the strength and vibration noise of these gear pairs on the basis of tooth contact analysis of actual tooth surface shapes.

Techniques for analyzing the tooth contact of the actual tooth surfaces of such gear pairs have been disclosed. For example, Non-patent document 1 (Aizo Kubo, et al.: On Simulation Methods of Performance of Hypoid and Spiral Bevel Gears (1st Report Definition of Reference for Tooth Form Accuracy and Method of Simulation), The Japan Society of Mechanical Engineers Journal (C), Vol. 62, No. 599, (1996-1997), Article No. 95-1547, pp. 2833-2841) discloses a technique which calculates the deviation between data on actual tooth surfaces and data on reference tooth surfaces (theoretical tooth surface shape) that is set in a tooth-cutting machine during a tooth surface machining, considers the deviation as the shape deviation of actual tooth surfaces from the reference tooth surfaces, and analyzes the meshing between the actual tooth surfaces on the basis of the meshing between reference tooth surfaces.

However, the technique disclosed in Non-patent document 1 requires information about the reference tooth surfaces. Therefore, although the technique is effective for gear pairs if information about their reference tooth surfaces is available as in the case where a user for himself or herself performed a series of work from specification design to tooth surface machining, the technique is difficult to apply to gear pairs for which information about their reference tooth surfaces is not available.

That is, the technique disclosed in Non-patent document 1 requires information about the reference tooth surfaces of gears that mesh with each other. Since these reference tooth surfaces vary from machine to machine, it is difficult to evaluate the tooth contact of a real gear pair unless information about machine settings is obtained.

The present invention has been made in light of these circumstances and an object of the present invention is to provide a gear pair evaluation apparatus and a gear pair evaluation program capable of implementing accurate tooth surface analysis on the basis of actual tooth surface measurement information without using information about reference tooth surfaces, and a gear pair whose tooth surfaces are evaluated by using the apparatus and the program.

DISCLOSURE OF INVENTION

Means for Solving the Problem

A gear pair evaluation apparatus according to the present invention includes: coordinate converting means for associating, at a predetermined meshing rotational position, three-dimensional coordinate data measured at each measurement point on a tooth surface of a first gear with three-dimensional coordinate data measured at each measurement point on a tooth surface of a second gear that meshes with the first gear by using an assembly specification of the gear pair and converting the three-dimensional coordinate data into three-dimensional coordinate data on a cylindrical coordinate system based on the first gear; function generating means for generating a function representing a point on a tooth surface of the second gear on the basis of the three-dimensional coordinate data on a tooth surface of the second gear; and inter-tooth-surface gap information calculating means for calculating, by using the function, relative angle information representing a gap between a point on a tooth surface of the first gear and a point on a tooth surface of the second gear that exists on the same circumference on which the point on the tooth surface of the first gear exists on the cylindrical coordinate system and corresponds to the point.

A gear pair evaluation program according to the present invention includes: a coordinate converting step of associating, at a predetermined meshing rotational position, three-dimensional coordinate data measured at each measurement point on a tooth surface of a first gear with three-dimensional coordinate data measured at each measurement points on a tooth surface of a second gear that meshes with the first gear by using an assembly specification of the gear pair and converting the three-dimensional coordinate data into three-dimensional coordinate data on a cylindrical coordinate system based on the first gear; a function generating step of generating a function representing a point on a tooth surface of the second gear on the basis of the three dimensional coordinate data on a tooth surface of the second gear; and an inter-tooth-surface gap information calculating step of calculating, by using the function, relative angle information representing a gap between a point on a tooth surface of the first gear and a point on a tooth surface of the second gear that exists on the same circumference on which the point on the tooth surface of the first gear exists on the cylindrical coordinate system and corresponds to the point.

According to the present invention, there is provided a gear pair whose tooth surfaces are evaluated by using the gear pair evaluation apparatus described above.

According to the present invention, there is provided a gear pair whose tooth surfaces are evaluated by using the gear pair evaluation program described above.

BEST MODE FOR CARRYING OUT THE INVENTION

Figure 1:
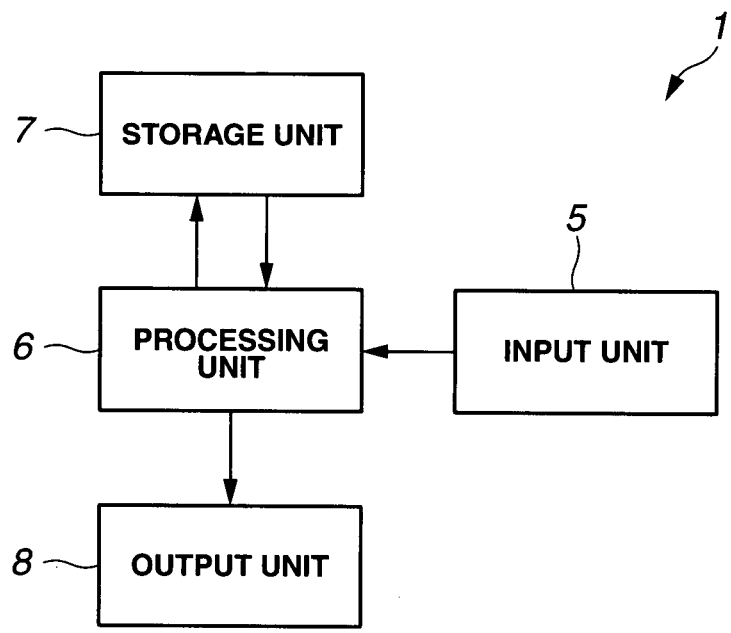
FIG. 1 relates to a first embodiment of the present invention and is a schematic configuration diagram of a gear pair evaluation apparatus.
Figure 2:
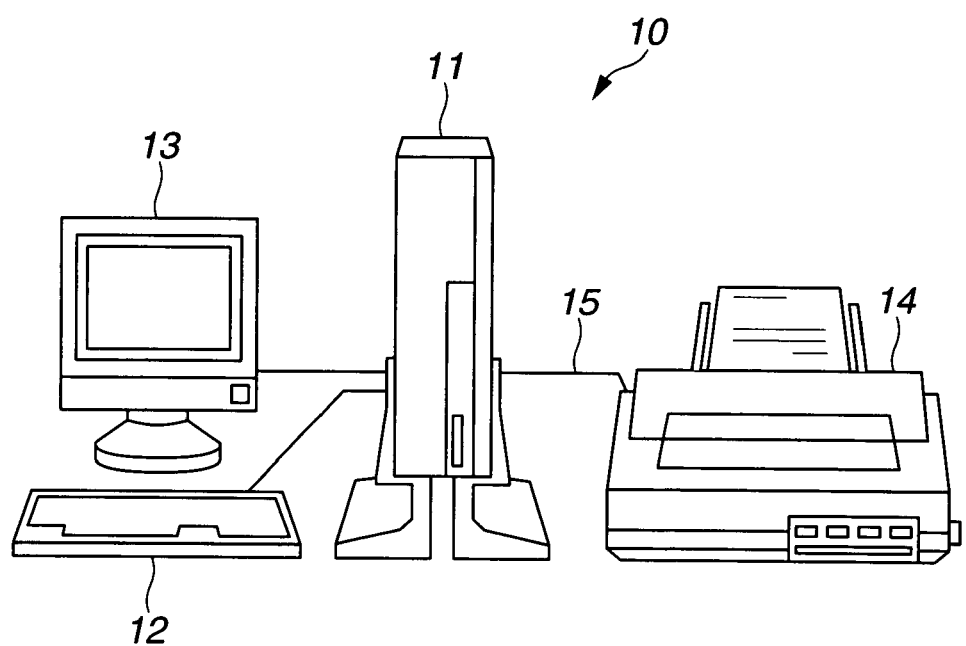
FIG. 2 relates to the first embodiment of the present invention and is a schematic diagram showing a configuration of an example of a computer system for implementing the gear pair evaluation apparatus.
Figure 3:
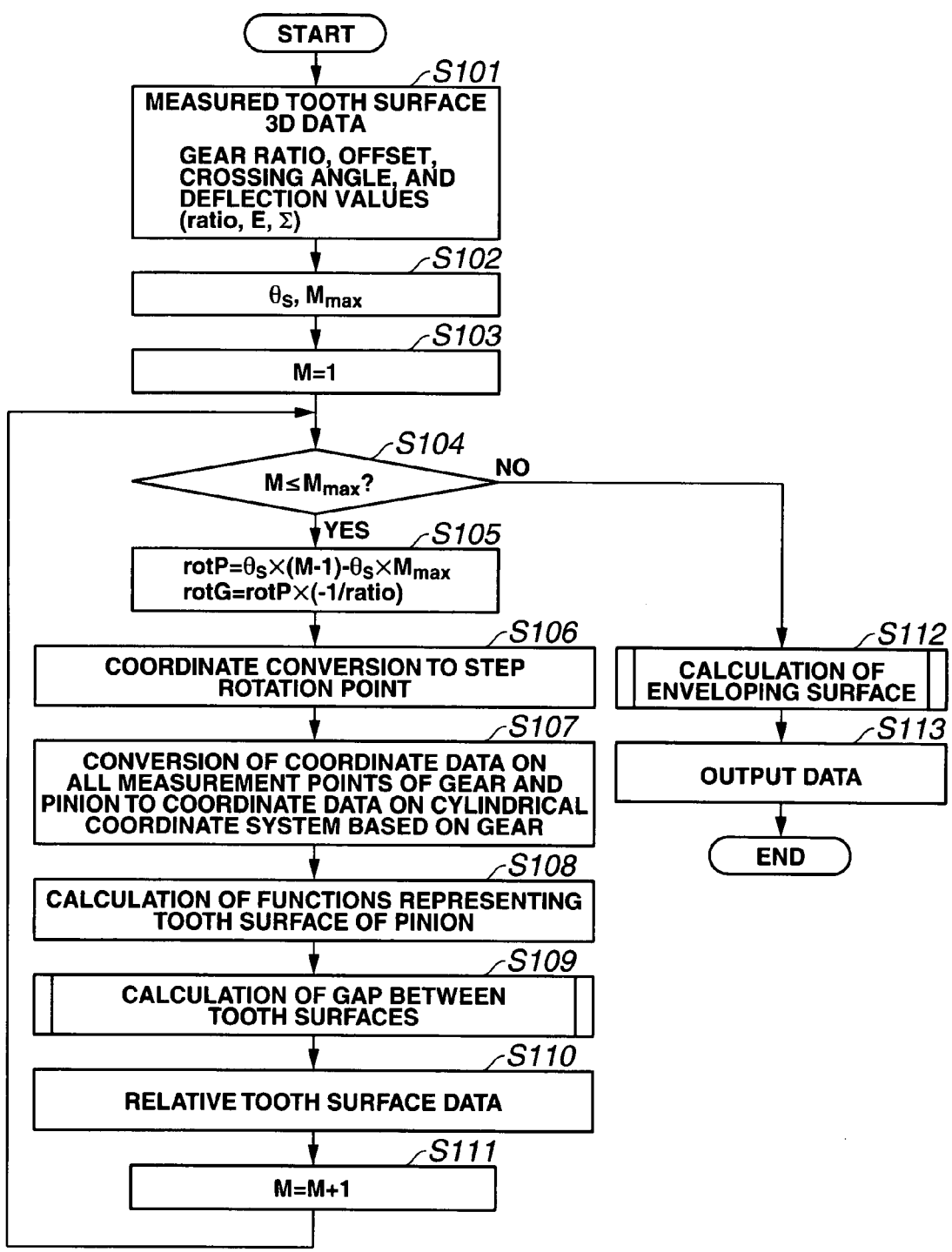
FIG. 3 relates to the first embodiment of the present invention and is a flowchart of a tooth contact analysis routine.
Figure 4:
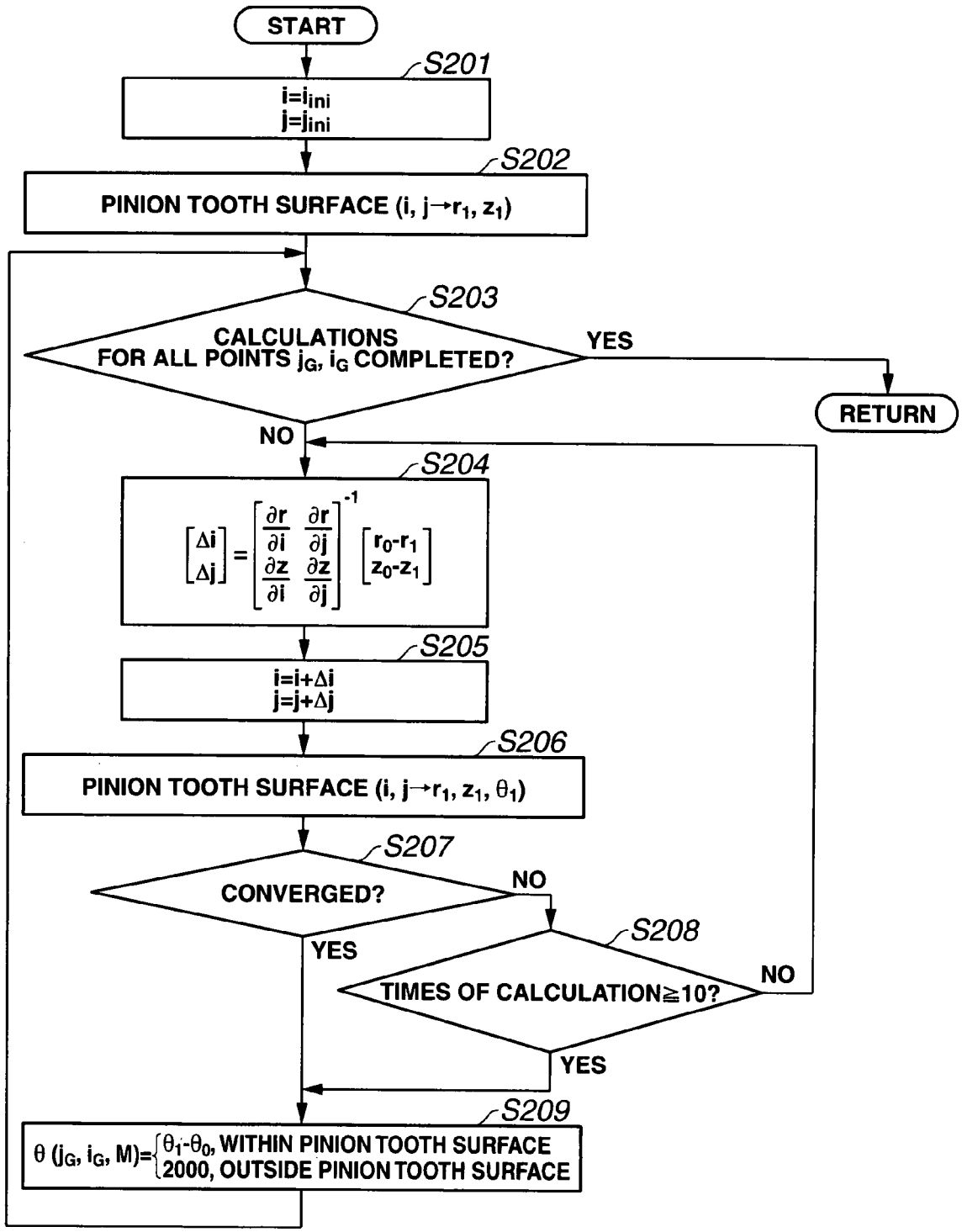
FIG. 4 relates to the first embodiment of the present invention and is a flowchart of an inter-tooth-surface gap calculation subroutine.
Figure 5:
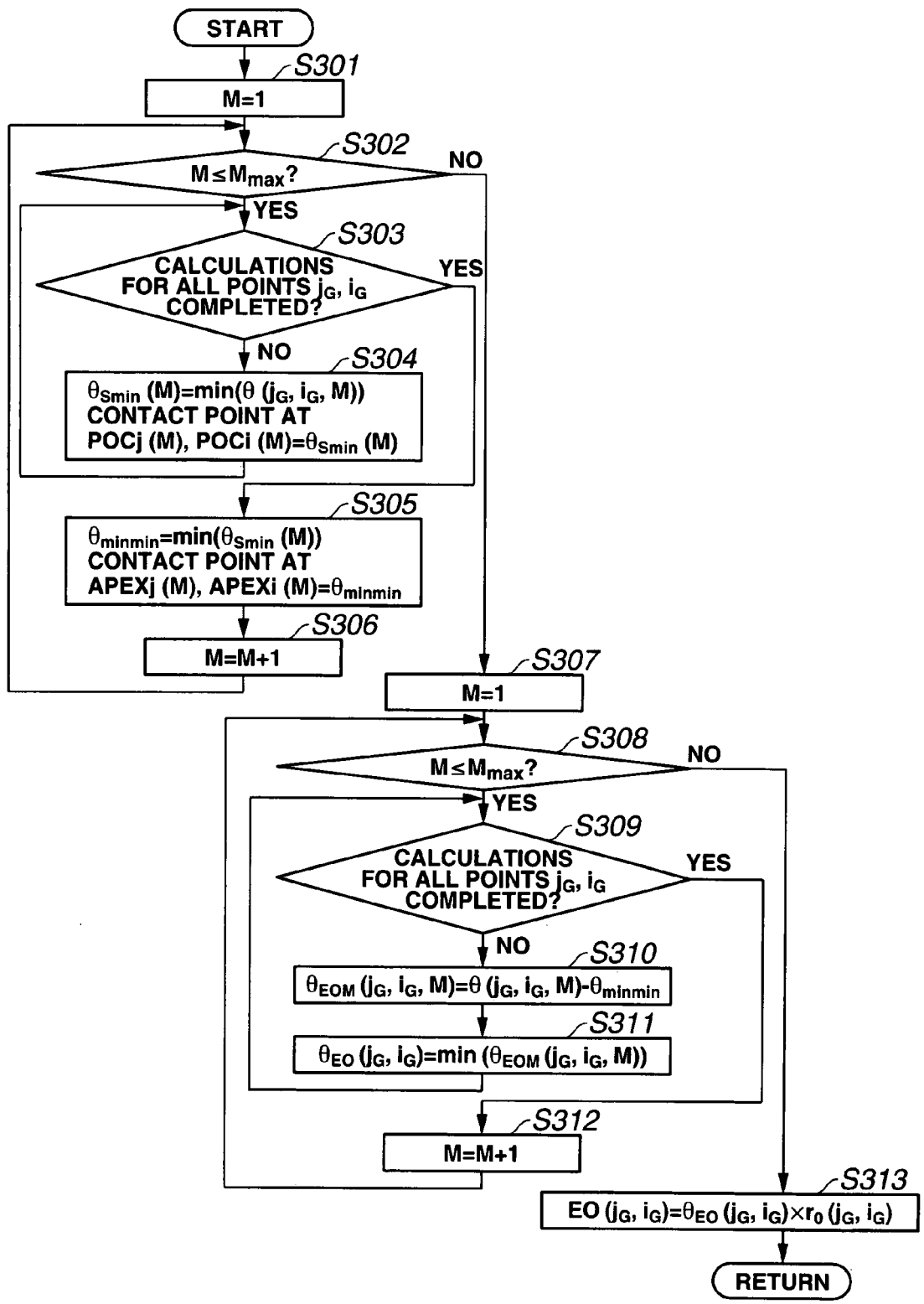
FIG. 5 relates to the first embodiment of the present invention and is a flowchart of an enveloping surface calculation subroutine.
Figure 6:
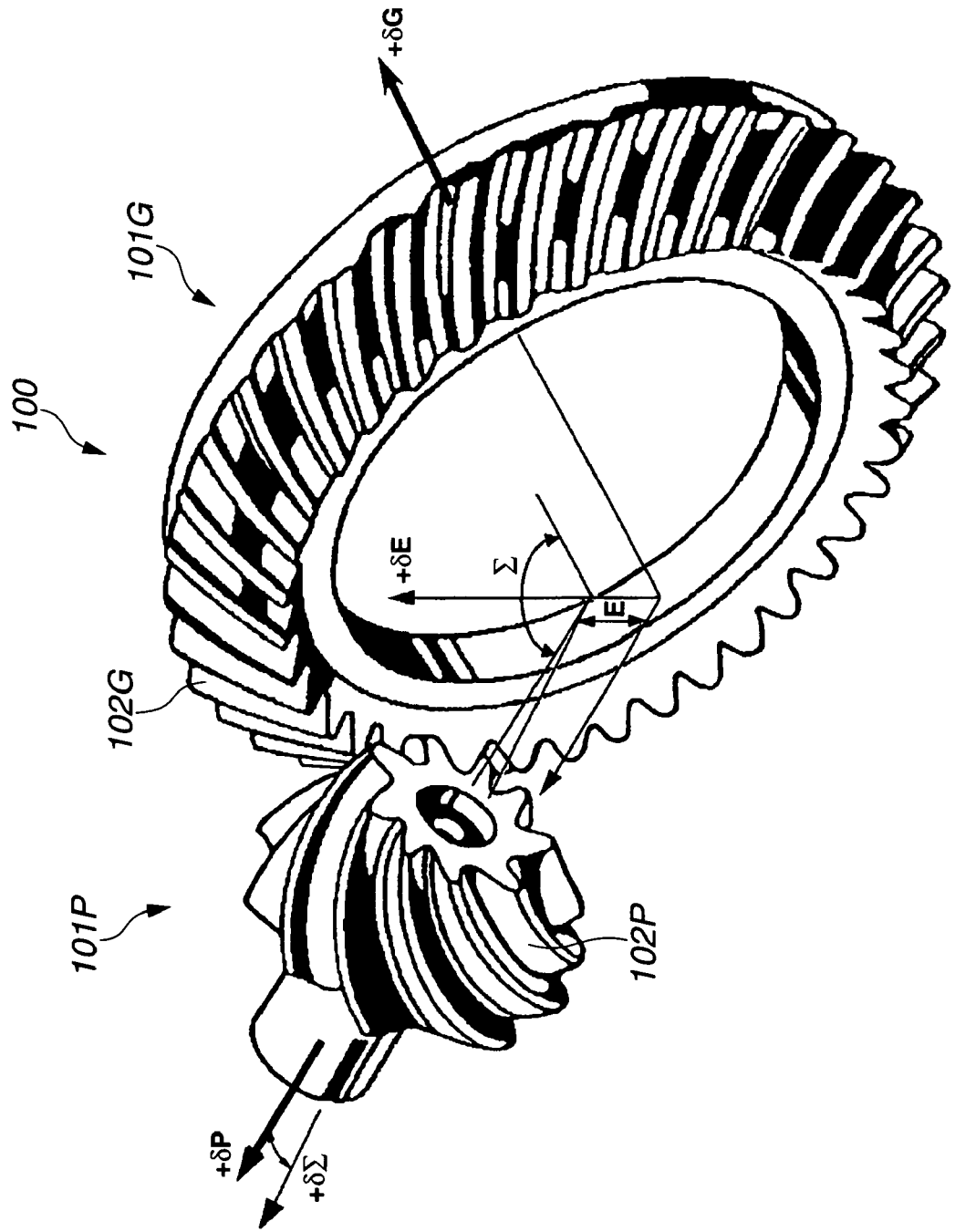
FIG. 6 relates to the first embodiment of the present invention and is a perspective view of a hypoid gear.
Figure 7:
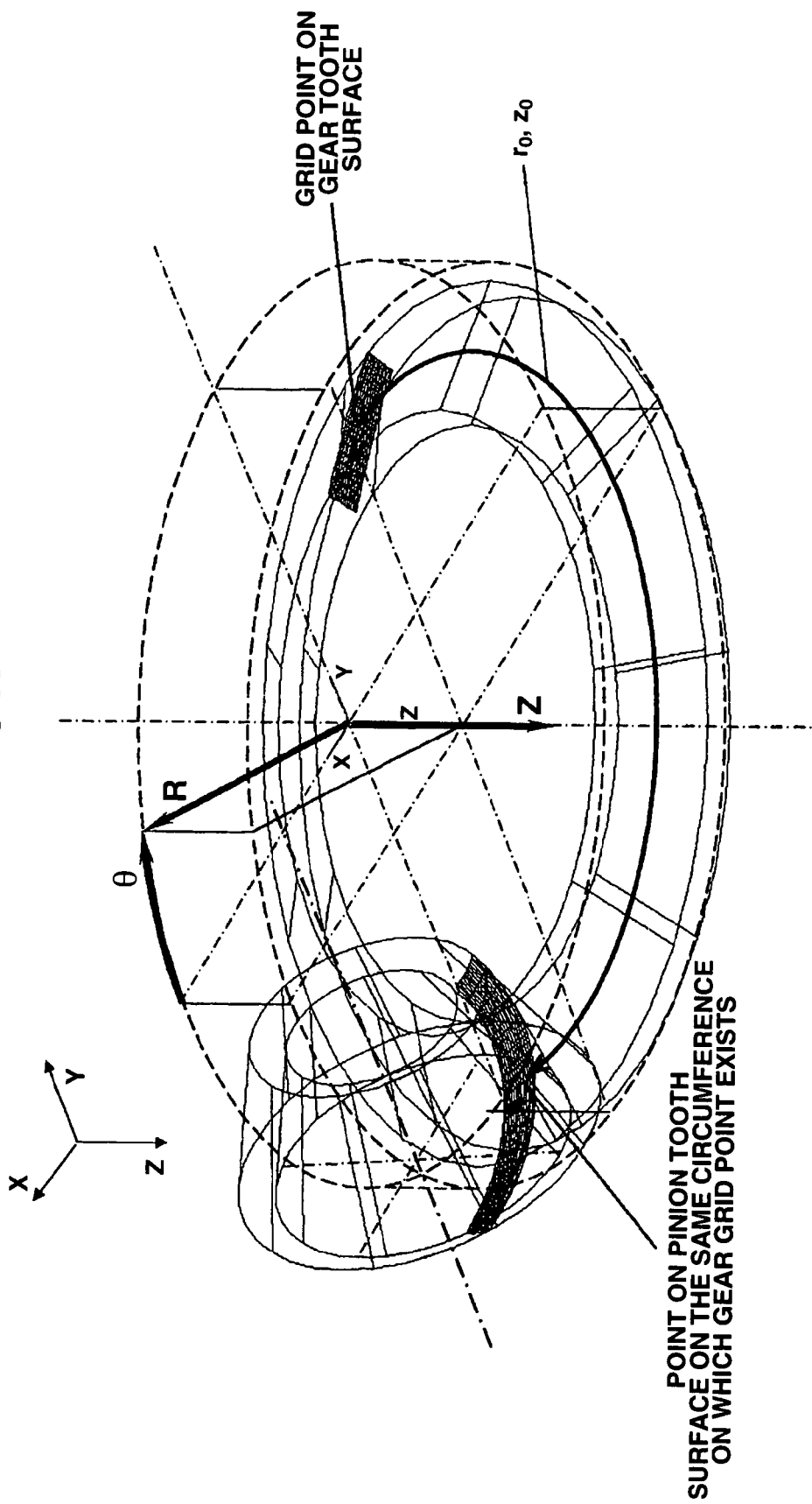
FIG. 7 relates to the first embodiment of the present invention and is a diagram showing a cylindrical coordinate system defining grid points on tooth surfaces of a gear and a pinion.
Figure 8:
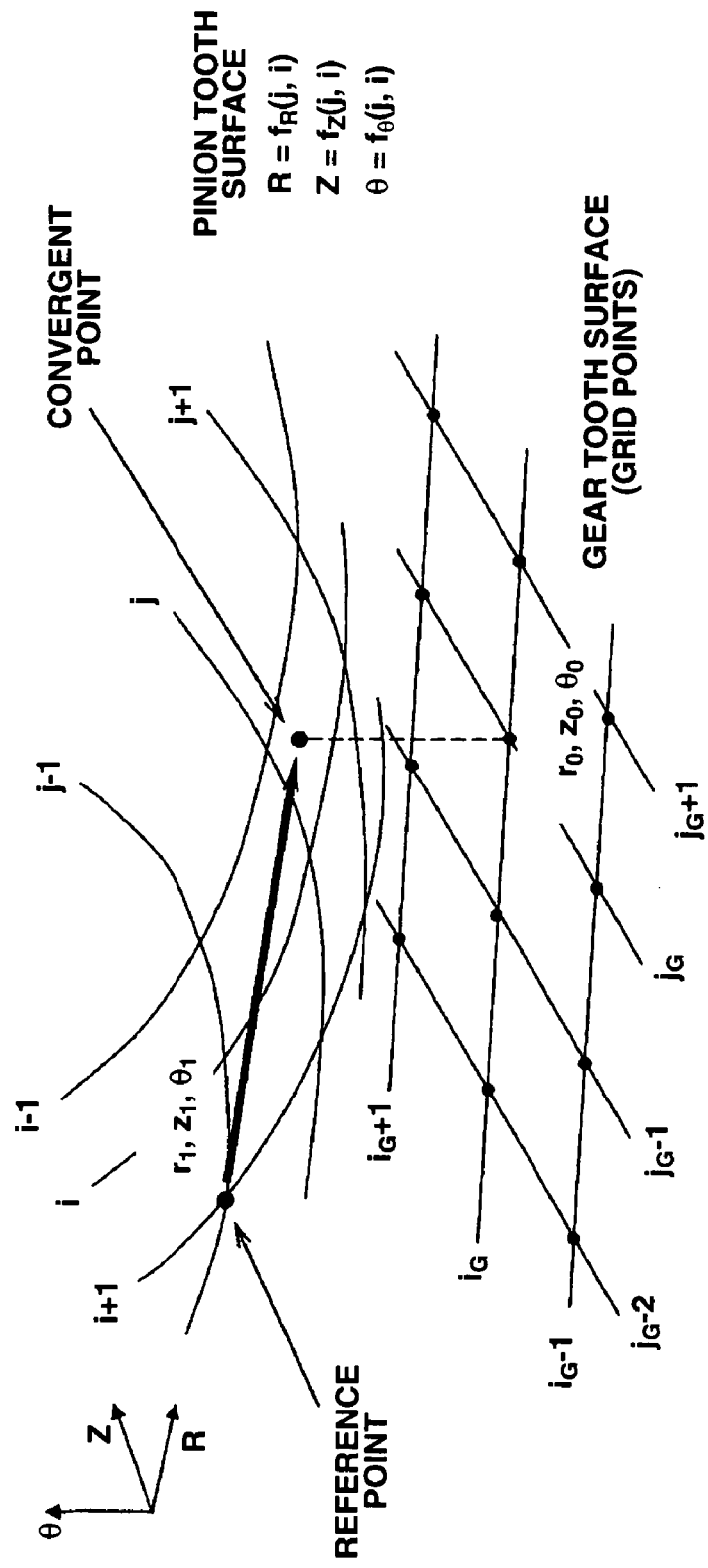
FIG. 8 relates to the first embodiment of the present invention and is a diagram showing the relationship between grid points on a gear tooth surface and a convergent point on a pinion tooth surface.
Figure 9:
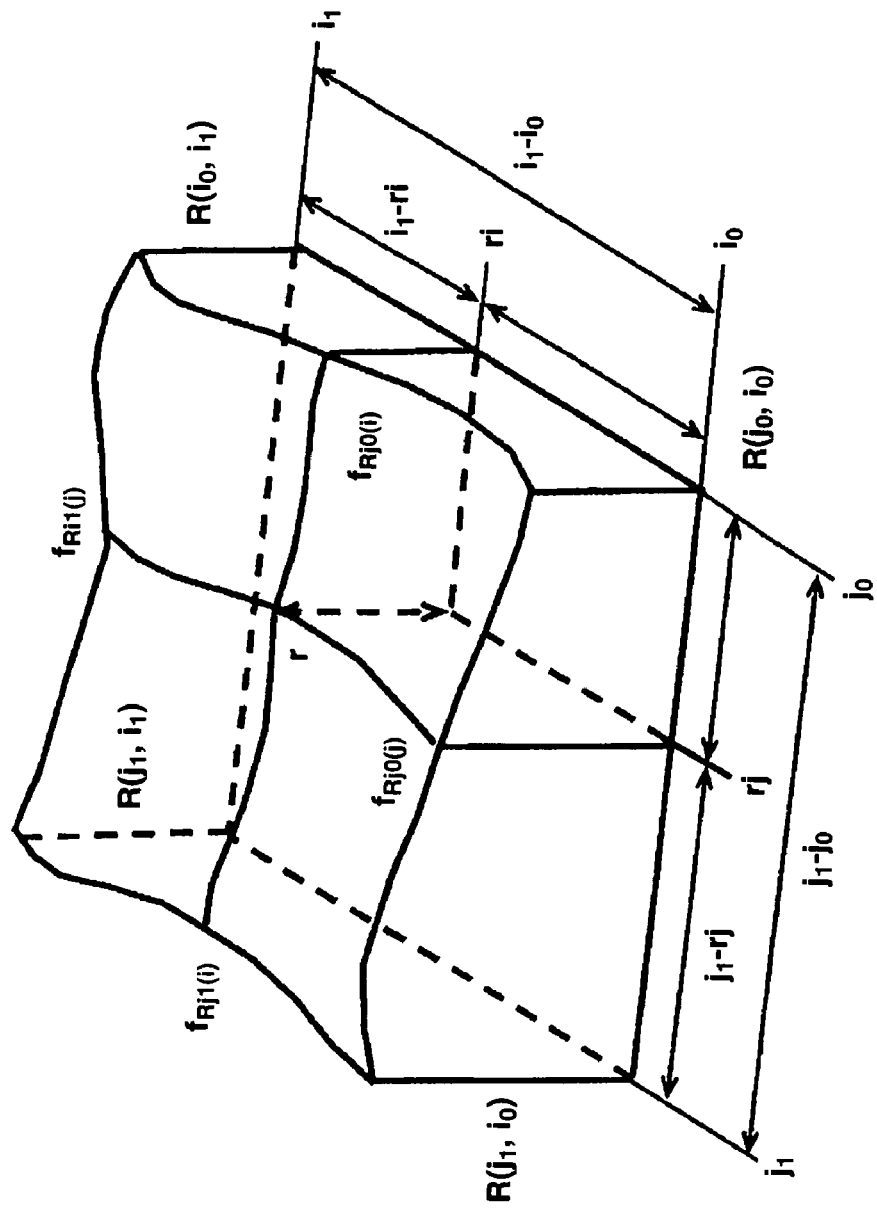
FIG. 9 relates to the first embodiment of the present invention and is a diagram showing a method for calculating surface coordinates.
Figure 10:
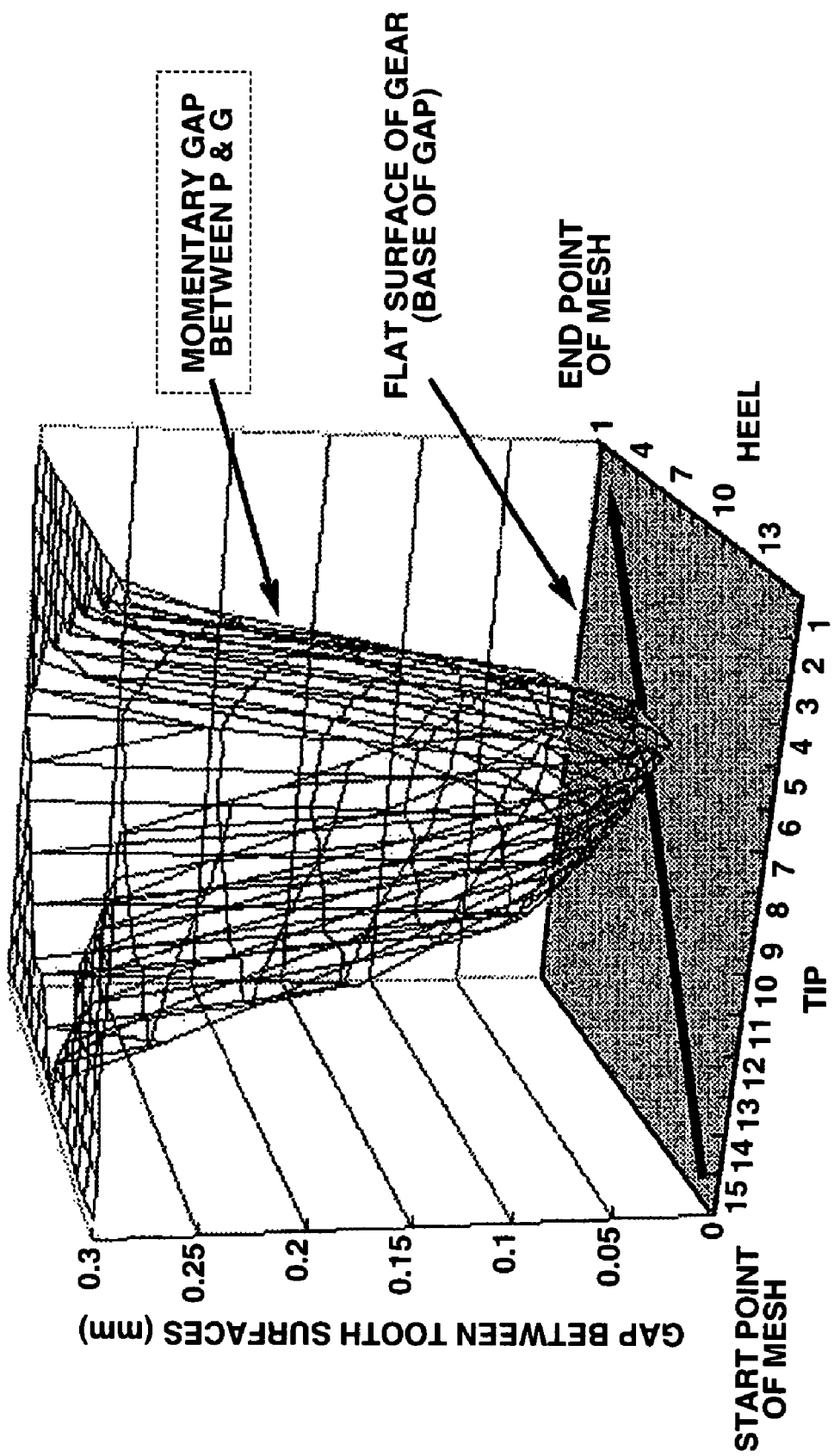
FIG. 10 relates to the first embodiment of the present invention and is a diagram showing a momentary gap relative to a gear tooth surface.
Figure 11:
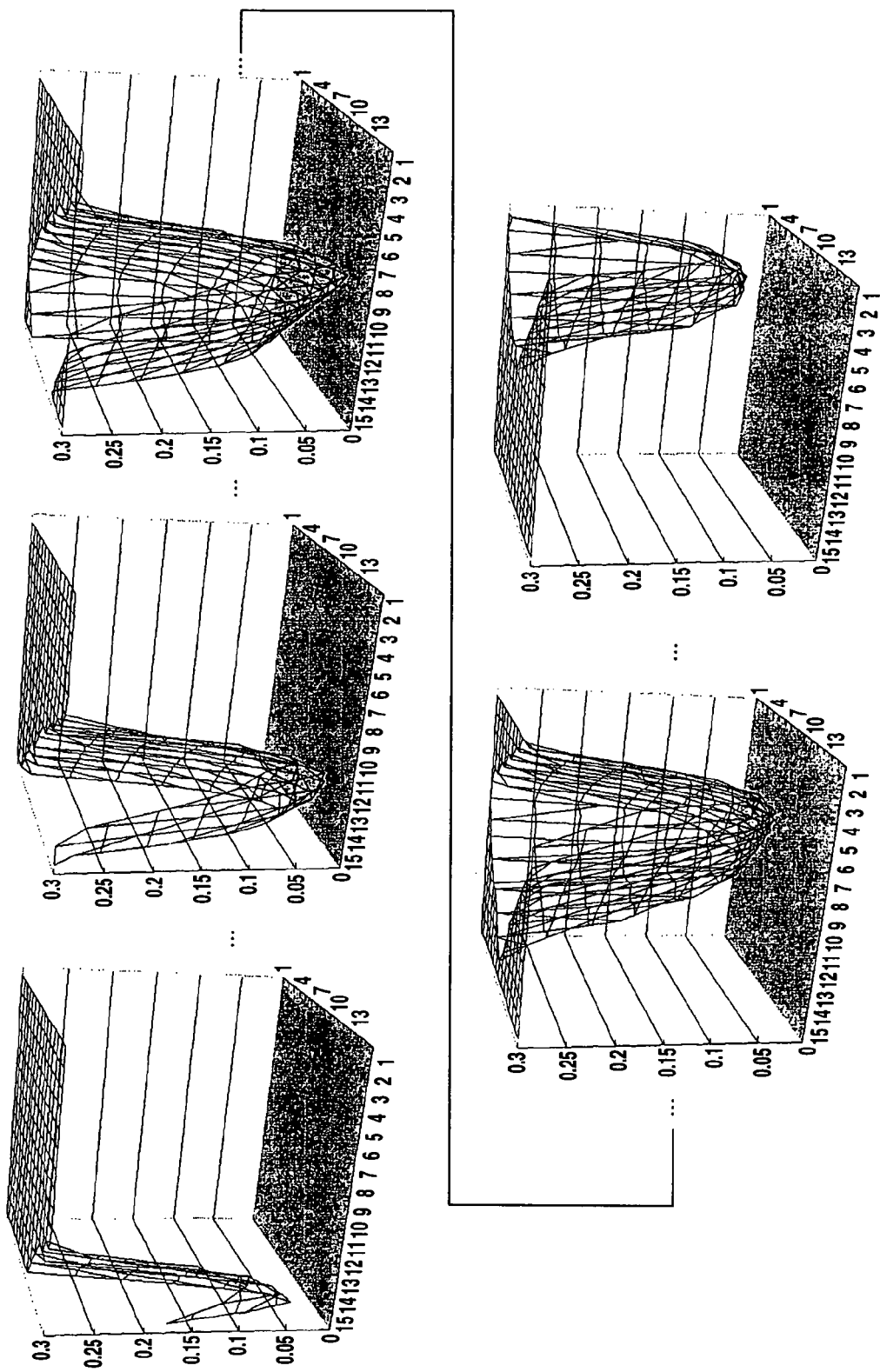
FIG. 11 relates to the first embodiment of the present invention and is a diagram showing relative tooth surfaces at different pinion rotation steps.
Figure 12:
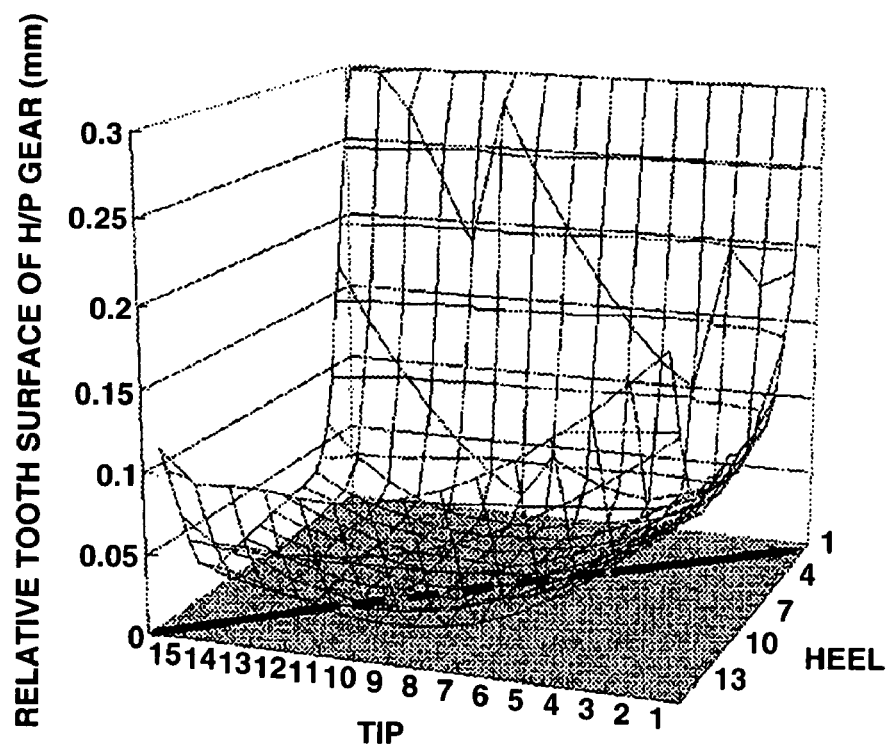
FIG. 12 relates to the first embodiment of the present invention and is a diagram showing an enveloping surface (ease-off) generated by combining the relative tooth surface shown in FIG. 11.
Figure 13:
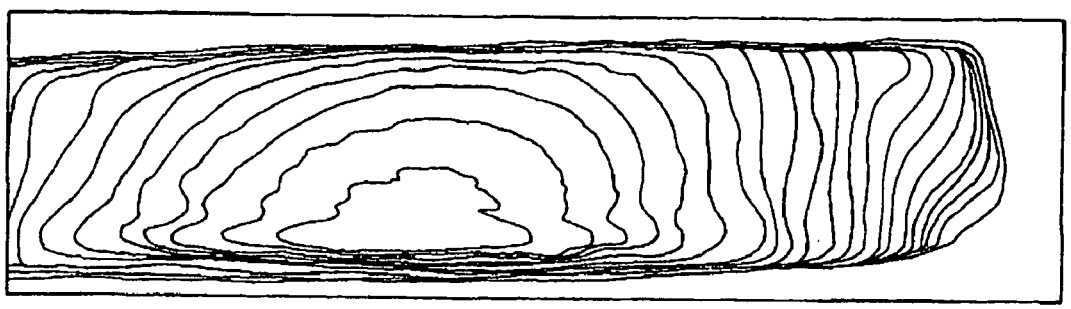
FIG. 13 relates to the first embodiment of the present invention and is a diagram showing a tooth surface distance distribution of a gear pair.

Embodiments of the present invention will be described with reference to the accompanying drawings. FIGS. 1 to 13 relate to a first embodiment of the present invention. FIG. 1 is a schematic block diagram showing a configuration of a gear pair evaluation apparatus; FIG. 2 is a schematic diagram showing a configuration of an example of a computer system for implementing the gear pair evaluation apparatus; FIG. 3 is a flowchart of a tooth contact analysis routine; FIG. 4 is a flowchart of a inter-tooth-surface gap calculation subroutine; FIG. 5 is a flowchart of an enveloping surface calculation subroutine; FIG. 6 is a perspective view of a hypoid gear; FIG. 7 is a diagram showing a cylindrical coordinate system defining grid points on tooth surfaces of a gear and a pinion; FIG. 8 is a diagram showing the relationship between grid points on a gear tooth surface and a convergent point on a pinion tooth surface; FIG. 9 is a diagram showing a method for calculating surface coordinates; FIG. 10 is a diagram showing a momentary gap relative to a gear tooth surface; FIG. 11 is a diagram showing relative tooth surfaces at different pinion rotation steps; FIG. 12 is a diagram showing an enveloping surface generated by combining the relative tooth surface shown in FIG. 11; and FIG. 13 is a diagram showing a tooth surface distance distribution of a gear pair.

Reference numeral 100 in FIG. 6 denotes a gear pair. The gear pair 100 in the present embodiment is a hypoid gear pair including a first gear having a larger diameter (hereinafter also referred to as a gear) 101G and a second gear having a smaller diameter (hereinafter also referred to as a pinion) 101P that mesh with each other.

The gear pair 100 is evaluated by using an evaluation apparatus 1 shown in FIG. 1 for example. The evaluation apparatus 1 includes an input unit 5 for inputting information concerning a real gear pair 100 such as three-dimensional coordinate data (measured values) and dimension data of the gear 101G and the pinion 101P, a processing unit 6 which performs calculations based on input information about the gear pair, a storage 7 which stores programs executed in the processing unit 6 and also stores inputted gear pair information and the results of calculations performed by the processing unit 6, and an output unit 8 which outputs the results of calculations performed by the processing unit 6.

Specifically, inputted in the evaluation apparatus 1 is three-dimensional coordinate data $(x_{Gji}, y_{Gji}, z_{Gji})$ measured at j×i grid points (for example 15 grid points in the tooth height direction×15 grid points in the tooth trace direction) set on a tooth surface (gear tooth surface) 102G of interest of the gear 101G, for example, as actual tooth surface information on the gear 101G. Also inputted in the evaluation apparatus 1 is three-dimensional coordinate data $(x_{Pji}, y_{Pji}, z_{Pji})$ measured at j×i grid points (for example 15 grid points in the tooth height direction×15 grid points in the tooth trace direction) set on a tooth surface (pinion tooth surface) 102P of interest of the pinion 101P, for example, as actual tooth surface information on the pinion 101P. The three-dimensional coordinate data $(x_{Gji}, y_{Gji}, z_{Gji})$ inputted in the evaluation apparatus 1 as actual tooth surface information on the gear 101G is coordinate data defined on the X-Y-Z orthogonal coordinate system having the origin $O_G$ on the axis of rotation of the gear 101G. The Y-axis of the orthogonal coordinate system in the present embodiment is set so as to pass through the center of the gear tooth surface 102G and Z-axis is set along the axis of rotation of the gear 101G. Similarly, the three-dimensional coordinate data $(x_{Pji}, y_{Pji}, z_{Pji})$ inputted in the evaluation apparatus 1 as actual tooth surface information on the pinion 101P is coordinate data defined on the X-Y-Z orthogonal coordinate system having the origin $O_P$ on the axis of rotation of the pinion 101P. The Y-axis of the orthogonal coordinate system in the present embodiment is set so as to pass through the center of the pinion tooth surface 102P and Z-axis is set on the axis of the axis of the rotation of the pinion 101P. While the coordinate systems that pass through the center of tooth surfaces are set in the present embodiment, the coordinate-system is not limited to these but can be set as appropriate.

Also inputted in the evaluation apparatus 1 are a gear ratio ratio, assembly specifications (offset E and crossing angle Σ), deflection values δE, δΣ, δG, and δP, and other dimension data concerning the gear pair 100. The deflection values are displacements caused by deformation due to a certain torque applied on the gear pair 100. Deflection value δE is a displacement of the offset E, δΣ is a displacement of the crossing angle Σ, δG is a displacement in the direction of the rotation axis of the gear 101G, and δP is a displacement in the direction of rotation axis of the pinion 101P (see FIG. 6).

The evaluation apparatus 1 associates the three-dimensional coordinate data ($x_{Gji}$, $y_{Gji}$, $z_{Gji}$) on the gear tooth surface 102G and the three-dimensional coordinate data ($x_{Pji}$, $y_{Pji}$, $z_{Pji}$) on the pinion tooth surface 102P with each other using the assembly specification of the gear pair 100 at a given meshing rotational position and converts these data into three-dimensional coordinate data ($r_{Gji}$, $z_{Gji}$, $\theta_{Gji}$) and ($r_{Pji}$, $z_{Pji}$, $\theta_{Pji}$) on the R-Z-Θ cylindrical coordinate system based on the gear 101G (see FIG. 7). When the evaluation apparatus 1 associates the three-dimensional coordinate data ($x_{Gji}$, $y_{Gji}$, $z_{Gji}$) on the gear tooth surface 102G and the three-dimensional coordinate data ($x_{Pji}$, $y_{Pji}$, $z_{Pji}$) on the pinion tooth surface 102P with each other, the evaluation apparatus 1 makes corrections using deflection values.

In addition, the evaluation apparatus 1 sets two-dimensional parameters (j, i) on the pinion tooth surface 102P in association with the numbers of the grid points on the pinion tooth surface 102P. The evaluation apparatus 1 uses the parameters (j, i) to generate a function $f_R(j, i)$ of radius coordinates, a function $f_Z(j, i)$ of axis coordinates, and a function $f_\Theta(j, i)$ of angle coordinates that represent points on the pinion tooth surface 102P on the basis of the three-dimensional coordinate data ($r_{Pji}$, $z_{Pji}$, $\Theta_{Pji}$).

The evaluation apparatus 1 also calculates parameters (j, i) representing points on the pinion tooth surface 102P on the same circumference as that of grid points on the gear tooth surface 102G on the R-Z-Θ cylindrical coordinate system from the functions $f_R(j, i)$ and $f_Z(j, i)$ using Newton's method and calculates relative angle information (inter-tooth-surface angle) representing the gap distance between each point (grid point) on the gear tooth surface 102G and its corresponding point on the pinion tooth surface 102P at a predetermined meshing rotational position on the basis of angle information $\theta_{Pji}$ obtained from function $f_\Theta(j, i)$ by using the calculated parameters (j, i).

Here, the evaluation apparatus 1 calculates a relative tooth surface (inter-tooth-surface angle) information with respect to each grid point on the gear tooth surface 102G at each of rotation angles (pinion rotation angles) $\theta_S$ into which one pitch of the pinion 101P is divided by a predetermined division number (that is, at each rotational position at which the gear 101G and the pinion 101P mesh with each other defined by the pinion rotation angle $\theta_S$). The evaluation apparatus 1 combines the relative tooth surface information calculated at the meshing rotation points to calculate an enveloping surface representing the relative gap distance between the gear tooth surface 102G and the pinion tooth surface 102P in the period from the start of meshing between the gear tooth surface 102G and the pinion tooth surface 102P to the end of the meshing.

Programs for performing the calculations described above are stored in the storage 7 of the evaluation apparatus 1 and the processing unit 6 executes the programs to implement the functions as coordinate converting means, function generating means, inter-tooth-surface gap information calculating means, and enveloping surface calculating means.

The evaluation apparatus 1 according to the present embodiment may be implemented by a computer system 10 shown in FIG. 2, for example. The computer system 10 includes as a computer main unit 11 and a keyboard 12, a display unit 13, which is an example of display means, and a printer 14 connected to the computer unit 11 through a cable 15, for example. Drive devices provided in the computer unit 11 and the keyboard 12 function as the input unit 15 and a CPU, a ROM, and a RAM contained in the computer unit 11 function as the processing unit 6. A hard disk contained in the computer unit 11 functions as the storage 7 and the display unit 13 and the printer 14 function as the output unit 8.

Tooth contact analysis performed by the processing unit 6 will be described below with reference to the flowchart of the tooth contact analysis routine shown in FIG. 3. When the routine starts, the processing unit 6 first reads gear pair information such as three-dimensional coordinate data ($x_{Gji}$, $y_{Gji}$, $z_{Gji}$) measured at grid points on a tooth surface 102G of the gear 101G, three-dimensional coordinate data ($x_{Pji}$, $y_{Pji}$, $z_{Pji}$) measured at grid points on a tooth surface 102P of the pinion 101P, the gear ratio ratio offset E, crossing angle Σ, and deflection values δE, δΣ, δG, and δP at step S101.

Then, at step S102, the processing unit 6 calculates the division number per pitch of the pinion 101P and the pinion rotation angle $\theta_S$ per step by using Equations (1) to (4) given below.

$$S_{wagi} = (2\pi/n_P) \cdot S_{wn} \tag{1}$$

$$opn = \text{Round}((2\pi/n_P)/(S_{wagi}/\max(j_{max}, i_{max})) \cdot c_{hn}) \tag{2}$$

$$\theta_s = (2\pi/n_P) \cdot (1/opn) \tag{3}$$

$$M_{max} = \text{Round}(S_{wagi}/\theta_s) + M_\alpha \tag{4}$$

Here, $S_{wagi}$ is the pinion rotation angle between the start of meshing and the end of the meshing, $n_P$ is the number of teeth of the pinion, $S_{wn}$ is the number of teeth that mesh with each other simultaneously (contact ratio), opn is the (integer) number of angle steps per meshing pitch, $C_{hn}$ is the number of angle steps per grid interval, and $M_\alpha$ is a correction value.

$M_{max}$ denotes the limit of angles to be calculated and is the maximum gear rotation step count $M_{max}$. "Round" in Equation (2) and (4) are soft function for rounding the values enclosed in parentheses.

The processing unit 6 proceeds from step S102 to S103, where the processing unit 6 sets the gear rotation step count M to 1. At step S104, the processing unit 6 determines whether the gear rotation step count M has reached the maximum gear rotation step count $M_{max}$.

If the processing unit 6 determines at step S104 that the gear rotation step count M has not yet reached the maximum gear rotation step count $M_{max}$, the processing unit 6 proceeds to step S105 and the sequence from step S105 to step S111 is repeated $M_{max}$ times to calculate relative tooth data at each meshing rotational position when the pinion 101P rotates by $\theta_s$(rad). On the other hand, if the processing unit 6 determines at step S104 that the gear rotation step count M has reached the maximum gear rotation step count $M_{max}$, the processing unit 6 proceeds to step S112.

When the processing unit 6 proceeds from step S104 to S105, the processing unit 6 calculates the rotation angles rotP and rotG of the pinion 101P and the gear 101G that correspond to the current gear rotation step count M by using Equations (5) and (6).

$$\text{rot}P = \theta_s \cdot (M-1) - (\theta_s \cdot M_{max}) \tag{5}$$

$$\text{rot}G = \text{rot}P \cdot (-1/\text{ratio}) \tag{6}$$

Then, at step S106, the processing unit 6 moves the coordinates of the grid points on the orthogonal coordinate system of the pinion 101P about the Z-axis by rotP(rad) and moves the coordinates of the grid points on the orthogonal coordinate system of the gear 101G about Z-axis by rotG(rad). After the orthogonal coordinate system of the pinion 101P aligns with the orthogonal coordinate system of the gear 101G, the processing unit 6 further moves the orthogonal coordinate system of the pinion 101P (from the reference position of cross points) by an offset E and rotates the orthogonal coordinate system of the pinion 101P by a crossing angle Σ, thereby setting the relation between the tooth surfaces 102G and 102P at the current step rotational position on the orthogonal coordinate system of the gear 101G. That is, the processing unit 6 converts the coordinate data $(x_{Pji}, y_{Pji}, z_{Pji})$ of the grid points on the pinion tooth surface 102P at the current step rotational position into coordinate data $(x_{Pji}, y_{Pji}, z_{Pji})$ on the orthogonal coordinate system of the gear 101G. In doing the conversion, the processing unit 6 corrects the origins $O_P$ and $O_G$ of the coordinate systems of the pinion 101 P and the gear 101G, respectively, using deflection values δP and δG, respectively, corrects the offset E using deflection value δE and the crossing angle Σ using deflection value δΣ.

Then, at step S107, the processing unit 6 converts the coordinate data of all measurement points (all gear grid points and pinion grid points) of the gear 101G and the pinion 101P represented on the orthogonal coordinate system based on the gear 101G at step S106 into coordinate data on the R-Z-Θ cylindrical coordinate system based on the gear 101G by using Equations (7) to (12) given below.

$$r_{Gji} = (x_{Gji}^2 + y_{Gji}^2)^{1/2} \tag{7}$$

$$z_{Gji} = z_{Gji} \tag{8}$$

$$\theta_{Gji} = \tan^{-1}(y_{Gji}/x_{Gji}) \tag{9}$$

$$r_{Pji} = (x_{Pji}^2 + y_{Pji}^2)^{1/2} \tag{10}$$

$$z_{Pji} = z_{Pji} \tag{11}$$

$$\theta_{Pji} = \tan^{-1}(y_{Pji}/x_{Pji}) \tag{12}$$

Then, at step S108, the processing unit 6 sets two-dimensional parameters j and i on the pinion tooth surface 102P in association with the numbers of the grid points and uses the parameters j and i to calculate functions $f_R(i, j)$, $f_Z(i, j)$, and $f_\theta(i, j)$ for interpolating the interval between grid points on the pinion tooth surface 102P on the basis of the coordinate data $(r_{Pji}, z_{Pji}, \theta_{Pji})$ of the grid points on the pinion tooth surface 102P. The functions $f_R(i, j)$, $f_Z(i, j)$, and $f_\theta(i, j)$ may be spline functions, for example.

Then, the processing unit 6 proceeds from step S108 to step S109, where the processing unit 6 calculates the inter-tooth-surface angle (relative tooth surface information) between grid points on the gear tooth surface 102G and their corresponding grid points on the pinion tooth surface 102P in accordance with the flowchart of the inter-tooth-surface gap calculation subroutine shown in FIG. 4. In the following description, the grid numbers (j, i) defining the grid points on the gear tooth surface 102G are denoted by $(j_G, i_G)$ to distinguish them from those on the pinion tooth surface 102P.

When the subroutine starts, the processing unit 6 sets initial values $(j=j_{ini}, i=i_{ini})$ of parameters at step S201 and obtains the coordinates $r_1(=R(j_{ini}, i_{ini}))$, $Z_1(=Z(j_{ini}, i_{ini}))$ of the reference point on the pinion tooth surface 102P defined by the initial values $j_{ini}$ and $i_{ini}$ (for example $j_{ini}=i_{ini}=8$) at step S202.

Then, at step S203, the processing unit 6 determines whether calculation of the inter-tooth-surface angle $\theta(j_G, i_G, M)$, which will be described later, has been performed for all grid points $j_G$, $i_G$ on the gear tooth surface 102G. If the processing unit 6 determines that the calculation of inter-tooth-surface angle $\theta(j_G, i_G, M)$ for all grid points on the gear tooth surface 102G has not been completed, the processing unit 6 updates the grid point for which the inter-tooth-surface angle $\theta(j_G, i_G, M)$ is to be calculated to a new grid point, then proceeds to step S204 and calculates the inter-tooth-surface angle $\theta(j_G, i_G, M)$ using Newton's method by the process from step S204 to S209. On the other hand, if the processing unit 6 determines at step S203 that the calculation of the inter-tooth-surface angle $\theta(j_G, i_G, M)$ has been performed for all grid points $(j_G, i_G)$ on the gear tooth surface 102G, the processing unit 6 exits the subroutine and returns to the main routine.

When the processing unit 6 proceeds from step S203 to step S204, the processing unit 6 generates Equations $$r_0 = r_1 + (\partial r/\partial i)\Delta i + (\partial r/\partial j)\Delta j \tag{13}$$

$$z_0 = z_1 + (\partial z/\partial i)\Delta i + (\partial z/\partial j)\Delta j \tag{14}$$

from three-dimensional coordinate data $(r_1, z_1, \theta_1)$ of a reference point set on the pinion tooth surface 102P and three-dimensional coordinate data $(r_0, z_0, \theta_0)$ of a convergent point, assuming that the three-dimensional coordinate data at the $(j_G, i_G)$-th grid point on the gear tooth surface 102G selected as the current grid point for which the inter-tooth-surface angle $\theta(j_G, i_G, M)$ is to be calculated is $(r_0, z_0, \theta_0)$, the three-dimensional data at the point (convergent point) on the pinion tooth surface 102P located on the same circumference on which the $(j_G, i_G)$-th grid point exists on the R-Z-Θ cylindrical coordinate is $(r_c, Z_c, \theta_c)$, and $(r_c, Z_c, \theta_c) = (r_0, z_0, \theta_0)$ Here, a radius coordinate (R coordinate) component r of a given point (j, i) on the pinion tooth surface 102P on the cylindrical coordinate system can be calculated by using Equation (15) given below. The gradient in the i direction $(\partial r/\partial i)$ and the gradient in the j direction $(\partial r/\partial j)$ at the coordinate r can be calculated by using Equations (16) and (17), respectively.

$$r = -(j_1 - j) \cdot (i_1 - i) \cdot R(j_0, i_0) - \tag{15}$$
$$(j_1 - j) \cdot (i - i_0) \cdot R(j_0, i_1) - (j - j_0) \cdot (i_1 - i) \cdot R(j_1, i_0) -$$
$$(j - j_0) \cdot (i - i_0) \cdot R(j_1, i_1) + (j_1 - j) \cdot f_{Ri0}(i) +$$
$$(j - j_0) \cdot f_{Rj1}(i) + (i_1 - i) \cdot f_{Ri0}(j) + (i - i_0) \cdot f_{Ri1}(j)$$

$$\frac{\partial r}{\partial i} = (j_1 - j) \cdot \left\{ R(j_0, i_0) - R(j_0, i_1) + \left( \frac{\partial f_{Rj0}(i)}{\partial i} \right) \right\} + \tag{16}$$
$$(j - j_0) \cdot \left\{ R(j_1, i_0) - R(j_1, i_1) + \left( \frac{\partial f_{Rj1}(i)}{\partial i} \right) \right\} - R(j, i_0) + R(j, i_1)$$

$$\frac{\partial r}{\partial j} = (i_1 - i) \cdot \left\{ R(j_0, i_0) - R(j_1, i_0) + \left( \frac{\partial f_{Ri0}(j)}{\partial j} \right) \right\} + \tag{17}$$
$$(i - i_0) \cdot \left\{ R(j_0, i_1) - R(j_1, i_1) + \left( \frac{\partial f_{Ri1}(j)}{\partial j} \right) \right\} - R(j_0, i) + R(j_1, i)$$

In Equations (15) to (17), $f_{Rj0}(i)$, $f_{Rj1}(i)$, $f_{Ri0}(j)$, and $f_{Ri1}(j)$ are radius coordinate components at any given point on functions surrounding a point (j, i) as shown in FIG. 9 and can be calculated on the basis of the functions generated at step S108 described above. $R(j_0, i_0)$, $R(j_0, i_1)$, $R(j_1, i_0)$, and $R(j_1, i_1)$ are radius coordinate components at grid points surrounding the point (j, i).

Similarly, the axis coordinate (Z coordinate) component z of any given point (j, i) on the pinion tooth surface 102P on the cylindrical coordinate system can be calculated by using Equation (18), and the gradient in the i direction $(\partial z/\partial i)$ and the gradient in the j direction $(\partial z/\partial j)$ at the coordinate z can be calculated by using Equations (19) and (20), respectively.

$$z = -(j_1 - j) \cdot (i_1 - i) \cdot Z(j_0, i_0) - (j_1 - j) \cdot (i - i_0) \cdot Z(j_0, i_1) - \tag{18}$$
$$(j - j_0) \cdot (i_1 - i) \cdot Z(j_1, i_0) - (j - j_0) \cdot (i - i_0) \cdot Z(j_1, i_1) +$$
$$(j_1 - j) \cdot f_{Zj0}(i) + (j - j_0) \cdot f_{Zj1}(i) + (i_1 - i) \cdot f_{Zi0}(j) + (i - i_0) \cdot f_{Zi1}(j)$$

-continued $$\frac{\partial z}{\partial i} = (j_1 - j) \cdot \left\{ Z(j_0, i_0) - Z(j_0, i_1) + \left( \frac{\partial f_{zj0}(i)}{\partial i} \right) \right\} + \quad (19)$$
$$(j - j_0) \cdot \left\{ Z(j_1, i_0) - Z(j_1, i_1) + \left( \frac{\partial f_{zj1}(i)}{\partial i} \right) \right\} - Z(j, i_0) + Z(j, i_1)$$

$$\frac{\partial z}{\partial j} = (i_1 - i) \cdot \left\{ Z(j_0, i_0) - Z(j_1, i_0) + \left( \frac{\partial f_{zi0}(j)}{\partial j} \right) \right\} + \quad (20)$$
$$(i - i_0) \cdot \left\{ Z(j_0, i_1) - Z(j_1, i_1) + \left( \frac{\partial f_{zi1}(j)}{\partial j} \right) \right\} - Z(j_0, i) + Z(j_1, i)$$

In Equations (18) to (20), $f_{zj0}(i)$, $f_{zj1}(i)$, $f_{zi0}(j)$, and $f_{zi1}(j)$ are axis coordinate components at any given point on functions surrounding a point (j, i) and can be calculated on the basis of the functions generated at step S108 described above. $Z(j_0, i_0)$, $Z(j_0, i_1)$, $Z(j, i_0)$, and $Z(i_1, i_1)$ are axis coordinate components at the grid points surrounding the point (j, i).

Then, the processing unit 6 solves the simultaneous equations (13) and (14) to obtain the deviations $\Delta i$ and $\Delta j$ of the parameters from the reference point to the convergent point.

Then, at step S205, the processing unit 6 uses the deviations $\Delta i$ and $\Delta j$ obtained at step S204 to update the parameters (j, i) of the reference point in accordance with Equations (21) and (22) given below.

$$i = i + \Delta i \quad (21)$$

$$j = j + \Delta j \quad (22)$$

Then the processing unit 6 proceeds to step S206, where the processing unit 6 updates the three-dimensional coordinate data $(r_1, z_1, \theta_1)$ at the reference point on the basis of the parameters (j, i) updated at step S205 by using Equations (15) and (18) given above and Equation (23) given below.

$$\theta = -(j_1 - j) \cdot (i_1 - i) \cdot \theta(j_0, i_0) - (j_1 - j) \cdot (i - i_0) \cdot \theta(j_0, i_1) - \quad (23)$$
$$(j - j_0) \cdot (i_1 - i) \cdot \theta(j_1, i_0) - (j - j_0) \cdot (i - i_0) \cdot \theta(j_1, i_1) +$$
$$(j_1 - j) \cdot f_{\theta j 0}(i) + (j - j_0) \cdot f_{\theta j 1}(i) + (i_1 - i) \cdot f_{\theta i 0}(j) + (i - i_0) \cdot f_{\theta i 1}(j)$$

In Equation (23), $f_{\theta j0}(i)$, $f_{\theta j1}(i)$, $f_{\theta i0}(j)$, and $f_{\theta i1}(j)$ are angle coordinate components at points surrounding the point (j, i) and are calculated on the basis of the functions generated at step S108 described above. $\theta(j_0, i_0)$, $\theta(j_0, i_1)$, $\theta(j_1, i_0)$, and $\theta(j_1, i_1)$ are angle coordinate components at grid points surrounding the point (j, i).

Then, the process proceeds to step S207, where the processing unit 6 determines whether the R-axis coordinate component $r_1$ and the Z-axis coordinate component $z_1$ at the reference point calculated at step S206 have converged to the R-axis coordinate component $r_c$ and Z-axis coordinate component $z_c$ at the convergent point (that is, whether $r_1$ and $z_1$ agree with $r_0$ and $z_0$, respectively, within a preset range). If the processing unit 6 determines that they have not converged, the processing unit 6 proceeds to step S208; otherwise, the processing unit 6 proceeds to step S209.

The processing unit 6 proceeds from step S207 to step S208, where the processing unit 6 determines whether the number of times of the calculation carried out at steps S204 to S206 for the currently selected grid point on the gear tooth surface 102G is greater than or equal to 10, for example. If the number of times of the calculation is less than 10, the processing unit 6 returns to step S204; if the number of times of the calculation is greater than or equal to 10, the processing unit 6 proceeds to step S209.

When the processing unit 6 proceeds from step S207 or S208 to step S209, the processing unit 6 calculates, as relative angle information, the inter-tooth-surface angle $\theta(j_G, i_G, M)$ at the current gear grid $j_G$, $i_G$ and gear rotation step count M, and then returns to step S203. If the processing unit 6 determines at step S207 that the R-axis coordinate component $r_1$ and Z-axis coordinate component $z_1$ at the reference point have converged to the R-axis coordinate component $r_c$ and Z-axis coordinate component $Z_c$ of the convergent point and proceeds to step S209 (that is, the point corresponding to the currently selected grid point on the gear tooth surface 102G exists within the pinion tooth surface 102P), the inter-tooth-surface angle $\theta(j_G, i_G, M)$ is calculated according to Equation (24) given below.

$$\theta(j_G, i_G, M) = \theta_1 - \theta_0 \quad (24)$$

On the other hand, if the process proceeds from step S208 to step S209, an angle value (for example $\theta(j_G, i_G, M) = 2000$) for determination indicating that the point corresponding to the currently selected grid point on the gear tooth surface 102G exists outside the pinion tooth surface 102P is set.

When the processing unit 6 returns from step S209 to step S203 in the subroutine, the processing unit 6 may re-set the values set at step S202 described above as the coordinates of the reference point on the pinion tooth surface 102P.

When the processing unit 6 proceeds from step S109 to S110 in the main routine, the processing unit 6 generates a relative tooth surface data (see for example FIG. 10) based on the gear tooth surface 102G on the basis of the inter-tooth-surface angles $\theta(j_G, i_G, M)$ calculated at step S109. At step S111 the processing unit 6 increments the gear rotation step count M by 1 (M=M+1), then returns to step S104.

When the processing unit 6 proceeds from step S104 to step S112, the processing unit 6 calculates an enveloping surface which represents the relative gap distance between the gear tooth surface 102G and the pinion tooth surface 102P, from the start of the meshing to the end of the meshing in accordance with the flowchart of the enveloping surface calculation subroutine shown in FIG. 5.

When the subroutine starts, the processing unit 6 sets the gear rotation step count M to 1 at step S301 and makes determination at step S302 as to whether the gear rotation step count M has reached the maximum gear rotation step count $M_{max}$.

If the processing unit 6 determines at step S302 that the gear rotation step count M has not yet reached the maximum gear rotation step count $M_{max}$, the processing unit 6 proceeds to step S303. On the other hand, if the processing unit 6 determines that the gear rotation step count M has reached the maximum gear rotation step count $M_{max}$, the processing unit 6 proceeds to step S307.

When the processing unit 6 proceeds from step S302 to step S303, the processing unit 6 determines whether a calculation for extracting the minimum inter-tooth surface angle $\theta_{Smin}(M)$, which will be described later, for the inter-tooth-surface angles $\theta(j_G, i_G, M)$ at all grid points on the gear tooth surface 102G has been completed at the current gear rotation step count M.

If the processing unit 6 determines at step S303 that the calculation for extracting the minimum inter-tooth-surface angle $\theta_{Smin}$ has not yet completed for the inter-tooth-surface angles $\theta(j_G, i_G, M)$ at all grid points, the processing unit 6 proceeds to step S304, where the processing unit 6 updates the minimum inter-tooth-surface angle $\theta_{Smin}(M)$ at the current gear rotation step count M with the inter-tooth-surface angle θ(j$_G$, i$_G$, M) at the currently selected grid point as appropriate, in accordance with the Equation (25) given below.

$$\theta_{Smin}(M) = \min(\theta(j_G, i_G, M)) \quad (25)$$

After updating the minimum inter-tooth-surface angle θ$_{Smin}$(M) with the inter-tooth-surface angle θ(j$_G$, i$_G$, M) at the currently selected grid point, the processing unit 6 updates the coordinates (POCj (M), POCi (M)) of the apex of the ease-off at the current gear rotation step count M to the coordinates (j$_G$, i$_G$) of the current grid point, and then returns to step S303.

On the other hand, if the processing unit 6 determines at step S303 that the calculation for extracting the minimum inter-tooth-surface angle θ$_{Smin}$(M) has been completed for the inter-tooth-surface angles θ(j$_G$, i$_G$M) at all grid points, the processing unit 6 proceeds to step S305.

At step S305, the processing unit 6 updates the minimum inter-tooth-surface angle θ$_{minmin}$ at all gear rotation steps with the minimum inter-tooth-surface angle θ$_{Smin}$ at the current gear rotation step M in accordance with Equation (26) given below.

$$\theta_{minmin} = \min(\theta_{Smin}(M)) \quad (26)$$

After updating the minimum inter-tooth-surface angle θ$_{minmin}$ at all gear rotation steps with the minimum inter-tooth-surface angle θ$_{Smin}$ at the current gear rotation step M, the processing unit 6 updates the coordinates (APEXj, APEXi) of the apex (i.e. the apex of the gear pair 100) of the ease-off at all gear rotation steps to the coordinates (POCj (M), POCi(M)) of the apex at the current gear rotation step M.

When the processing unit 6 proceeds from step S305 to step S306, the processing unit 6 updates the gear rotation step count M (M=M+1) and then returns to step S302.

When the processing unit 6 proceeds from step S302 to step S307, the processing unit 6 uses all inter-tooth-surface angles θ(j$_G$, i$_G$M) calculated at the individual gear rotation step counts M to perform steps S308 to S312 to calculate ease-off data θ$_{EO}$((j$_G$, i$_G$) which is an angle value at each grid point (j$_G$, i$_G$) on the gear tooth surface 102G representing the relative gap distance between the gear tooth surface 102G and the pinion tooth surface 102P from the start of the meshing to the end of the meshing.

Specifically, the processing unit 6 sets the gear rotation step count M to 1 at step S307 and then determines at step S308 whether the gear rotation step count M has reached the maximum gear rotation step count M$_{max}$.

If the processing unit 6 determines at step S308 that the gear rotation step count M has not yet reached the maximum gear rotation step count M$_{max}$, the processing unit 6 proceeds to step S309. On the other hand, if the processing unit 6 determines that the gear rotation step count M has reached the maximum gear rotation step count M$_{max}$, the processing unit 6 proceeds to step S313.

When the processing unit proceeds from step S308 to step S309, the processing unit 6 determines whether a calculation of ease-off data θ$_{EOM}$(j$_G$, i$_G$, M), which will be described later, has been completed for all grid points ((j$_G$, i$_G$) on the gear tooth surface 102G at the current gear rotation step count M.

If the processing unit 6 determines at step S309 that the calculation of ease-off data θ$_{EOM}$(j$_G$, i$_G$, M) for all grid points (j$_G$, i$_G$) has not been completed, the processing unit 6 proceeds to step S310 and calculates ease-off data θ$_{EOM}$ based on the minimum inter-tooth-surface angle θ$_{minmin}$ using Equation (27) given below.

$$\theta_{EOM}(j_G, i_G, M) = \theta(j_G, i_G, M) - \theta_{minmin} \quad (27)$$

Then, at step S311, the processing unit 6 uses the ease-off data θ$_{EOM}$(j$_G$, i$_G$, M) on the currently selected grid point (j$_G$, i$_G$) to update corresponding ease-off data θ$_{EO}$(j$_G$, i$_G$) as appropriate using Equation (28) given below, and then returns to step S309.

$$\theta_{EO}(j_G, i_G) = \min(\theta_{EOM}(j_G, i_G, M)) \quad (28)$$

On the other hand, if the processing unit 6 determines at step S309 that the calculation of ease-off data θ$_{EOM}$(j$_G$, i$_G$, M) has been completed for all grid points (j$_G$, i$_G$) at the current gear rotation step count M, the processing unit 6 proceeds to step S312, where the processing unit 6 increments the gear rotation step count M by 1 (M=M+1), and then returns to step S308.

When the processing unit 6 proceeds from step S308 to step S313, the processing unit 6 converts the ease-off data θ$_{EO}$((j$_G$, i$_G$) at each grid point ((j$_G$, i$_G$) on the gear tooth surface 102G into distance information (ease-off data EO(j$_G$, i$_G$)) in accordance with Equation (29) given below, and then exits the subroutine to return to the main routine.

$$EO(j_G, i_G) = \theta_{EO}(j_G, i_G) \cdot r_0(j_G, i_G) \quad (29)$$

As a result, an enveloping surface (see for example FIG. 12) is generated that is a combination of the relative tooth surface (see FIG. 11 for example) at the individual gear rotation step counts M.

Then, the processing unit 6 proceeds from step S112 to step S113, where the processing unit 6 converts the three-dimensional enveloping surface data generated at step S112 into two-dimensional contour data (see FIG. 13 for example) and outputs the contour data through the output unit 8 such as the display unit 13, then exits the routine.

According to the embodiment described above, three-dimensional coordinate data (x$_{Gji}$, y$_{Gji}$, z$_{Gji}$) on the gear tooth surface 102G and three-dimensional coordinate data (x$_{Pji}$, y$_{Pji}$, z$_{Pji}$) on the pinion tooth surface 102P are associated with each other at a predetermined meshing rotational position using the assembly specifications of the gear pair 100 and are converted into three-dimensional coordinate data (r$_{Gji}$, z$_{Gji}$, θ$_{Gji}$) and (r$_{Pji}$, z$_{Pji}$, θ$_{Pji}$) in the cylindrical coordinate system based on the gear 101G, and two-dimensional parameters (j, i) set on the pinion tooth surface 102P are used to generate functions f$_R$(j, i), f$_z$(j, i), and f$_θ$(j, i) that represent points on the pinion tooth surface 102P on the basis of the three-dimensional coordinate data (r$_{Pji}$, z$_{Pji}$, θ$_{Pji}$). Thus, parameters (j, i) representing the points on the pinion tooth surface 102P that correspond to points (grid points) on the gear tooth surface 102G can be easily and accurately calculated from the functions f$_R$(j, i) and f$_z$(j, i) using Newton's method. Based on angle information θ$_{Pji}$ that can be obtained from function f$_θ$(j, i) using the calculated parameters (j, i), the inter-tooth-surface angle θ(j$_G$, i$_G$, M) representing the gap between a point (grid point) on the gear tooth surface 102G and the point of the pinion tooth surface 102P that corresponds to the grid point at a given meshing rotational position can be obtained. Thus, accurate tooth surface analysis can be accomplished on the basis of actual tooth surface measurement information without using information about reference tooth surfaces of the gear pair as measures.

The accuracy of the tooth surface analysis can be further improved by correcting the sets of the three-dimensional coordinate data associated with each other using assembly specifications for the gear pair 100 with deflection values of the gear pair 100.

Furthermore, the minimum angle between tooth surfaces (minimum inter-tooth-surface angle θ$_{minmin}$) is extracted from the inter-tooth-surface angles θ(j$_G$, i$_G$, M) at grid points ($j_G$, $i_G$) calculated at rotational positions at which the gear 101G and the pinion 101P mesh with each other (each gear rotation step count M), and the extracted minimum inter-tooth-surface angle $\theta_{minmin}$ is used as the reference to calculate a three-dimensional enveloping surface representing the relative gap distance between the gear 101G and the pinion 101P from the start to end of the mesh between the gear 101G and the pinion 101P on the basis of the inter-tooth-surface angles $\theta(j_G, i_G M)$. Thus, gear pair information useful for tooth surface analysis can be provided to the user.

In addition, the coordinates (APEXj, APEXi) on the gear tooth surface 102G that correspond to the minimum inter-tooth-surface angle $\theta_{minmin}$ are extracted as the apex of meshing of the gear pair 100. Thus, gear pair information useful for tooth surface analysis can be provided to the user.

Furthermore, the data on the calculated three-dimensional enveloping surface is converted into two-dimensional contour data. Thus, gear pair information more useful for tooth surface analysis can be provided to the user.

Figure 14:
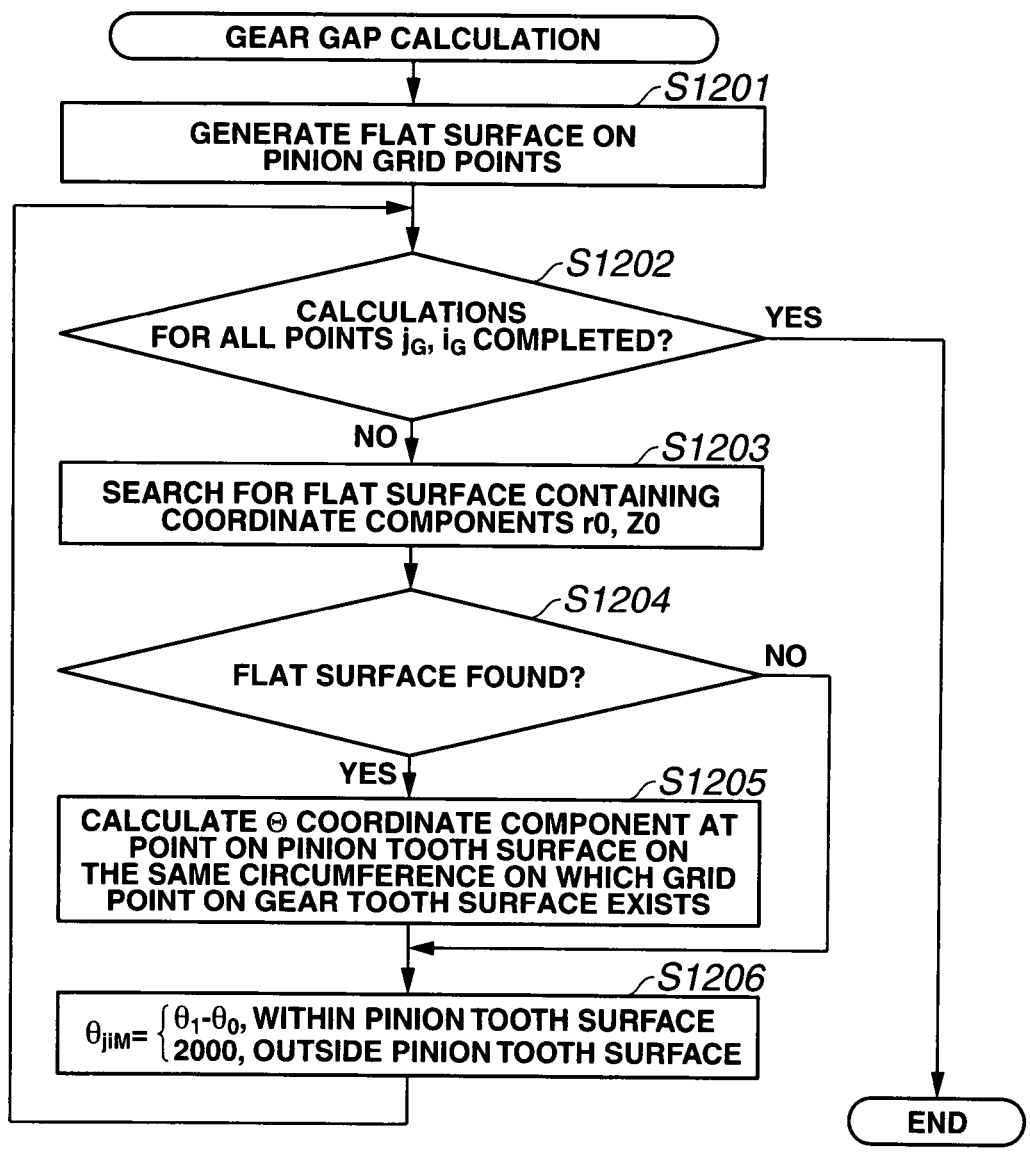
FIG. 14 relates to a second embodiment of the present invention and is a flowchart of an inter-tooth-surface gap calculation subroutine.
Figure 15:
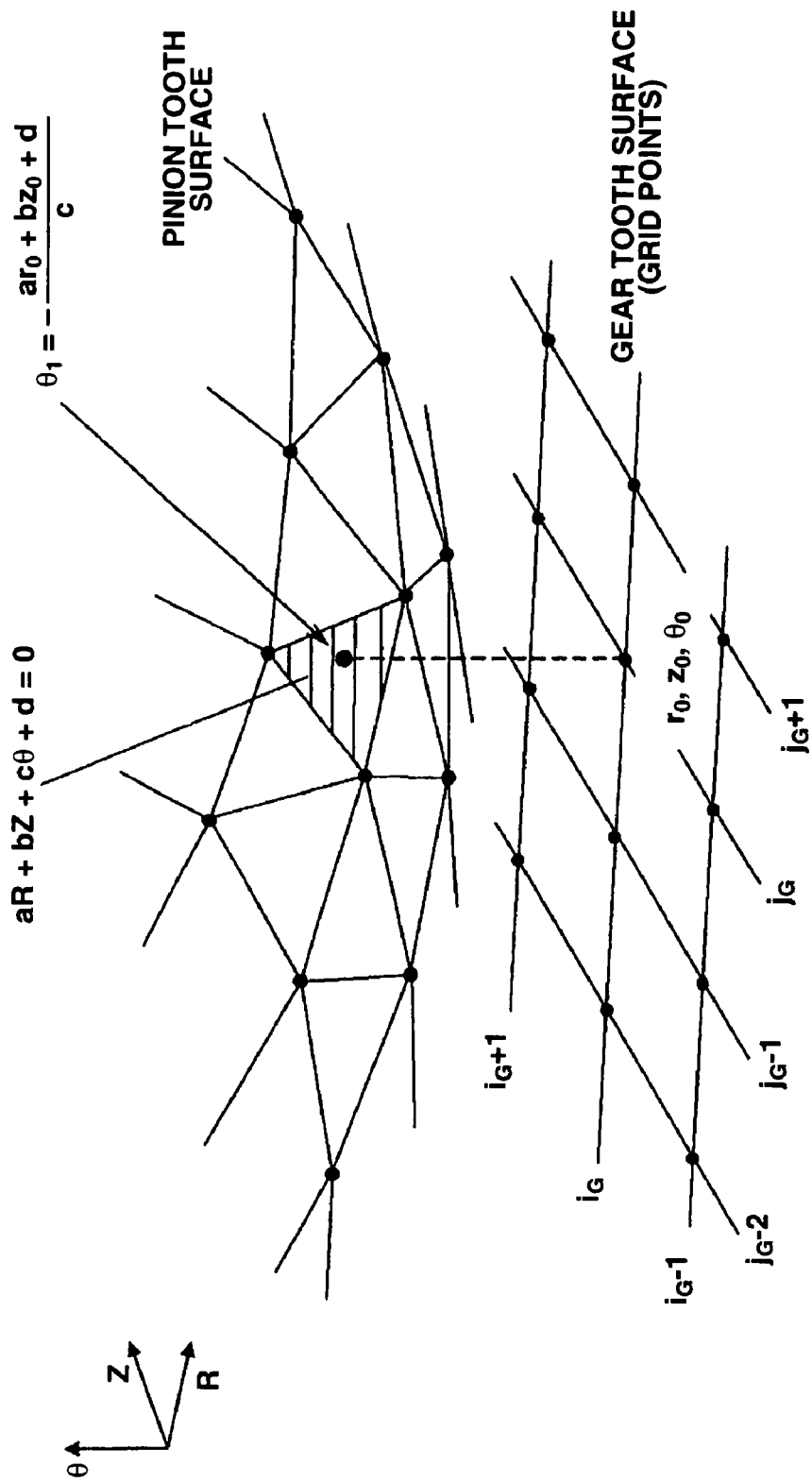
FIG. 15 relates to the second embodiment of the present invention and is a diagram showing the relationship between grid points on a gear tooth surface and points on a plane set on a pinion tooth surface.
Figure 16:
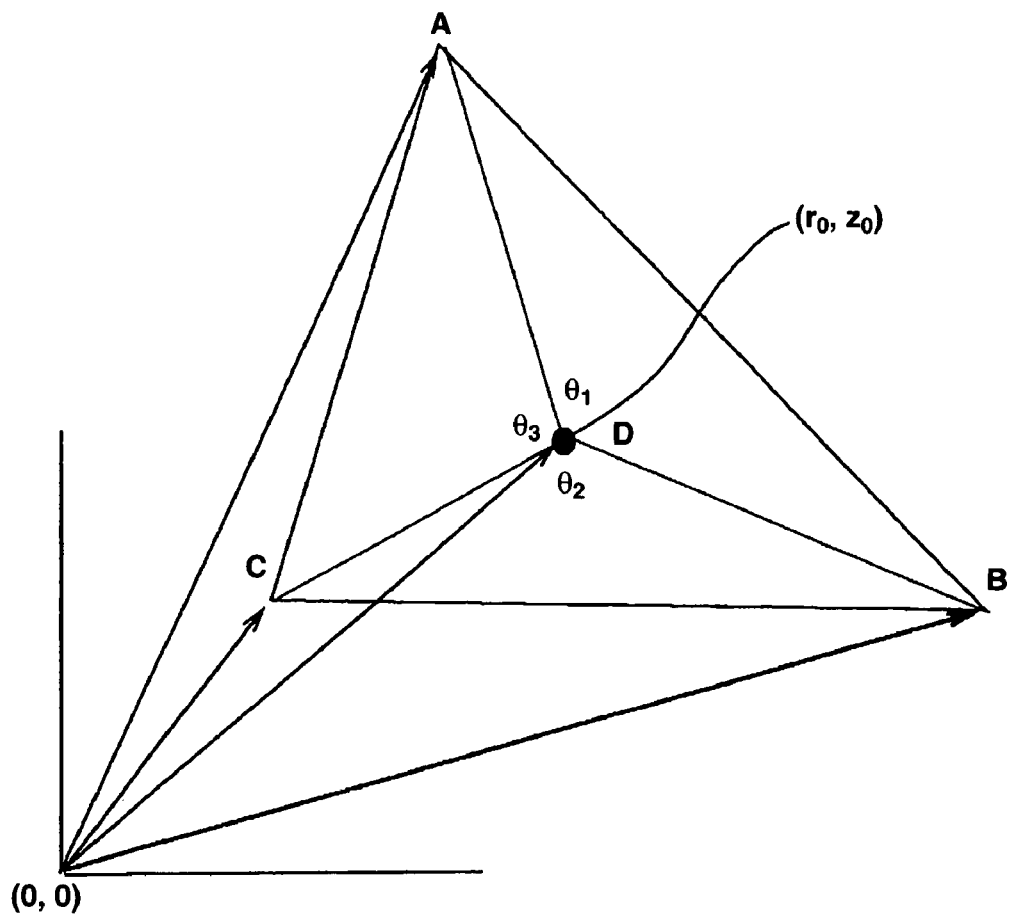
FIG. 16 relates to the second embodiment of the present invention and is a diagram showing a condition when a point on a pinion tooth surface that corresponds to a grid point on a gear tooth surface exists on a flat surface.
Figure 17:
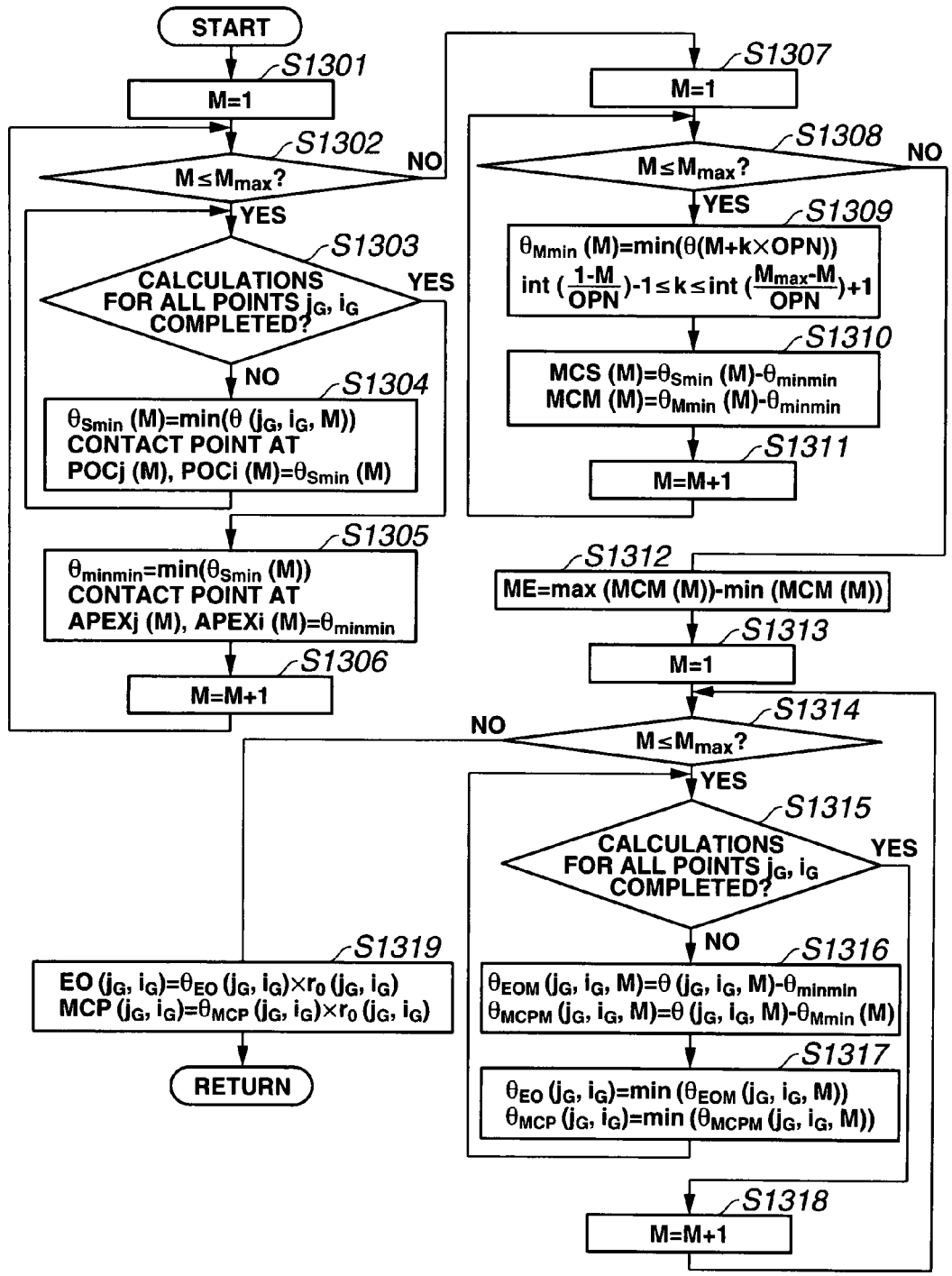
FIG. 17 relates to the second embodiment of the present invention and is a flowchart showing an enveloping surface calculation subroutine.
Figure 18:
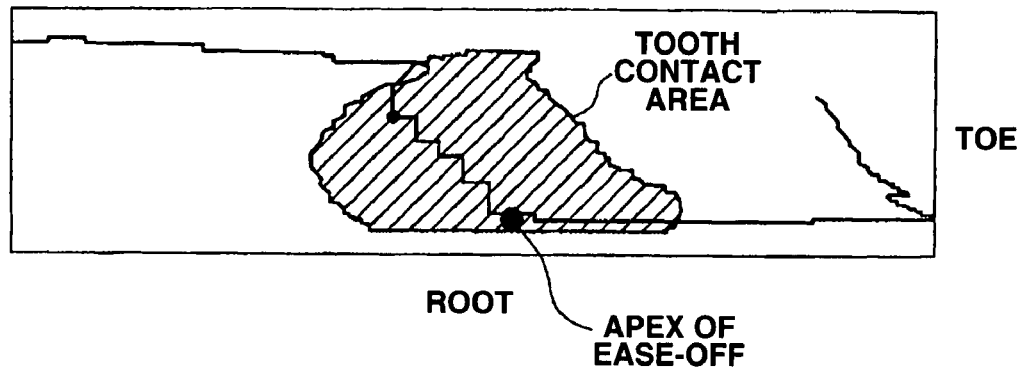
FIG. 18 relates to the second embodiment of the present invention and is a diagram showing a gear-pinion tooth contact area and the locus of the contact point.
Figure 19:
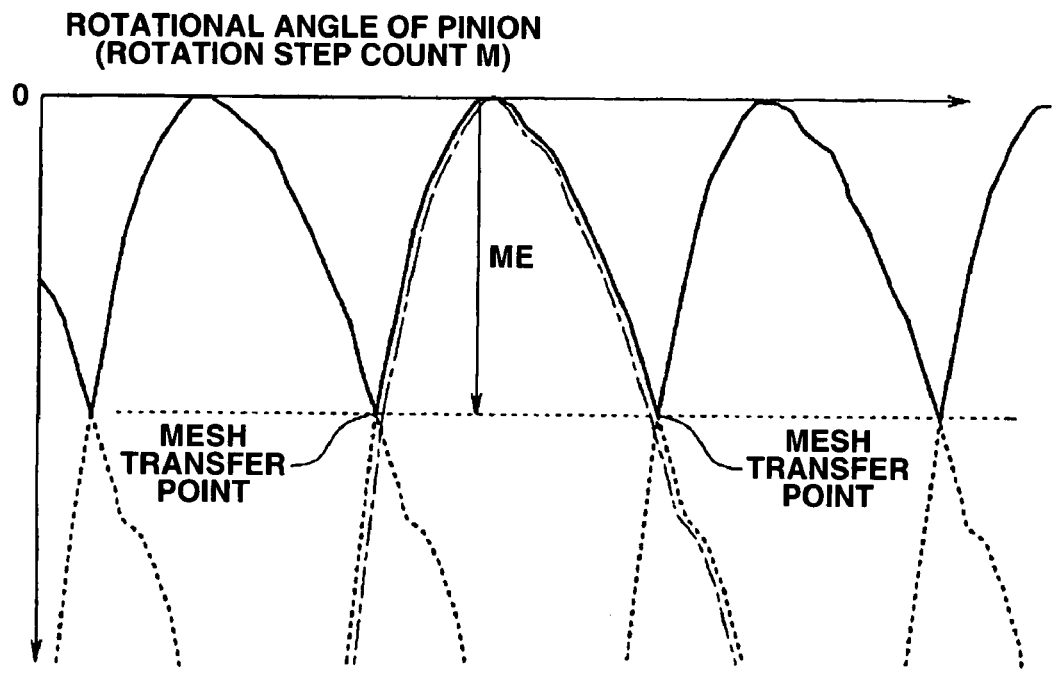
FIG. 19 relates to the second embodiment of the present invention and is a diagram showing a transmission error between a gear and a pinion.

FIGS. 14 to 19 relate to a second embodiment of the present invention. FIG. 14 is a flowchart of an inter-tooth-surface gap calculation subroutine; FIG. 15 is a diagram showing the relationship between grid points on a gear tooth surface and points on a plane set on a pinion tooth surface; FIG. 16 is a diagram showing a condition when a point on a pinion tooth surface that corresponds to a grid point on a gear tooth surface exists on a flat surface; FIG. 17 is a flowchart showing an enveloping surface calculation subroutine; FIG. 18 is a diagram showing a gear-pinion tooth contact area and the locus of the contact point; and FIG. 19 is a diagram showing a transmission error between a gear and a pinion. The second embodiment differs from the first embodiment mainly in that instead of the method for calculating the gap between tooth surfaces using Newton's method and spline functions, a method for calculating the gap between tooth surfaces is used in which multiple flat surfaces for approximating a pinion tooth surface are used. Furthermore, in the second embodiment, a calculation for meshing between multiple pairs of teeth are performed in addition to a calculation for a single pair of teeth in the enveloping surface calculation subroutine performed in the first embodiment described above. Description of configurations that are the same as those in the first embodiment will be omitted.

When the subroutine shown in FIG. 14 starts, the processing unit 6 generates flat surfaces that approximate a pinion tooth surface 102P on the basis of the coordinate data ($r_{Pji}$, $z_{Pji}$, $\theta_{Pji}$) of grid points on the pinion tooth surface 102P at step S1201. That is, the processing unit 6 sequentially extracts a set of three adjacent grid points and sets a flat surface equation, for example Equation (30) given below, on the basis of the coordinate data on each set of grid points to approximate the pinion tooth surface 102P with multiple flat surfaces at step S1201 (see FIG. 15).

$$aR+bZ+c\Theta+d=0 \quad (30)$$

In Equation (30), a, b, and c are coefficients and d is a constant.

Then, at step S1202, the processing unit 6 determines whether calculation of inter-tooth-surface angle $\theta(j_G, i_G M)$ has been performed for all grid points $j_G$, $i_G$ on the gear tooth surface 102G. If the processing unit 6 determines that the calculation of inter-tooth-surface angle $\theta(j_G, i_G M)$ has not been completed to all the grid points on the gear tooth surface 102G, the processing unit 6 updates the current grid point for which the inter-tooth-surface angle $\theta(j_G, i_G, M)$ is to be calculated to new grid point and then proceeds to step S1203 and performs operations at steps S1203 to S1206 to calculate the inter-tooth-surface angle $\theta(j_G, i_G, M)$. On the other hand, if the processing unit 6 determines at step S1202 that the calculation of inter-tooth-surface angle $\theta(jd_G, i_G, M)$ has been performed for all grid points ($j_G$, $i_G$) on the gear tooth surface 102G, the processing unit 6 exits the subroutine and returns to the main routine.

When the processing unit 6 proceeds from step S1202 to step S1203, the processing unit 6 searches for a flat surface containing the R-coordinate component and the Z-coordinate component of the ($j_G$, $i_G$)-th grid point on the gear tooth surface 102G selected as the current grid point for which the inter-tooth-surface angle $\theta(j_G, i_G, M)$ is to be calculated from the flat surfaces generated at step S1201.

Here, if three grid points A, B, and C that define a flat surface on the pinion tooth surface 102P and a grid point D on the gear tooth surface 102G are represented on a R-Z two-dimensional coordinate system as shown in FIG. 16, the vector from grid point D to grid point A, the vector from grid point D to grid point B, and the vector from grid point D to grid point C can be represented by Equations (31) to (33) using vectors from the reference point (0, 0) of each grid point to each of grid points A-D. In the following description, $[\,]_v$ denotes a vector.

$$[DA]_v=[A]_v-[D]_v \quad (31)$$

$$[DB]_v=[B]_v-[D]_v \quad (32)$$

$$[DC]_v=[C]_v-[D]_v \quad (33)$$

By using these vectors, the angle $\theta_1$ between $[DA]_v$ and $[DB]_v$, the angle $\theta_2$ between $[DB]_v$ and $[DC]_v$, and the angle $\theta_3$ between $[DC]_v$ and $[DA]_v$ can be represented by Equations (34) to (36) given below.

$$\theta_1 = \arccos\left(([DA]_v \cdot [DB]_v)/([DA]_v[DB]_v)\right) \quad (34)$$

$$\theta_2 = \arccos\left(([DB]_v \cdot [DC]_v)/([DB]_v[DC]_v)\right) \quad (35)$$

$$\theta_3 = \arccos\left(([DC]_v \cdot [DA]_v)/([DC]_v[DA]_v)\right) \quad (36)$$

When $\theta_1+\theta_2+\theta_3=2\pi$ in the R-Z two-dimensional coordinate system, grid point D exists in an area surrounded by grid points A, B, and C.

Therefore, the processing unit 6 represents the three-dimensional coordinate data at the ($j_G$, $i_G$)-th grid point on the gear tooth surface 102G that are selected as a grid point for which the inter-tooth-surface angle $\theta(j_G, i_G M)$ is to be calculated as ($r_0$, $z_0$, $\theta_0$) and uses the R-coordinate component $r_0$ and Z-coordinate component $z_0$ of the grid point and the R-coordinate component and Z-coordinate component of each set of three grid points on the pinion tooth surface 102P that defines each flat surface to perform sequentially the vector operation given above to search for the corresponding flat surface.

When processing unit 6 proceeds from step S1203 to step S1204, the processing unit 6 determines whether a flat surface containing the currently selected grid point on the gear tooth surface 102G is found in the R-Z two-dimensional coordinate system, if the processing unit 6 determines that the flat surface is found, the processing unit 6 proceeds to step S1205; otherwise, the processing unit 6 proceeds to step S1206.

When the processing unit 6 proceeds from step S1204 to step S1205, the processing unit 6 obtains the $\Theta$-coordinate component $\theta_1$ of a point on the pinion tooth surface 102P that exists on the same circumference on which a grid point on the gear tooth surface 102G exists in the R-Z-$\Theta$-coordinate system, and then proceeds to step S1206. The R-coordinate component and Z-coordinate component of the point on the pinion tooth surface 102P that exists on the same circumference on which the grid point on the gear tooth surface 102G exists coincide with the grid point on the gear tooth surface 102G. Therefore, the processing unit 6 transforms the equation of the flat surface found at step S1203 and assigns $r_0$ and $z_0$ in the equation to generate Equation (37) given below, and calculates $\theta_1$ in accordance with Equation (37).

$$\theta_1 = -(ar_0 + bz_0 + d)/c \tag{37}$$

When the processing unit 6 proceeds from step S1204 or S1205 to step S1206, the processing unit 6 calculates the inter-tooth-surface angle $\theta(j_G, i_G, M)$ at the current gear grid $j_G$, $I_G$ and gear rotation step count M as relative angle information and then returns to step S1202. If the processing unit 6 determines at step S1204 that a flat surface containing the currently selected grid point on the gear tooth surface 102G exists and proceeds to step S1206 through S1205, the processing unit 6 calculates the inter-tooth-surface angle $\theta(j_G, i_G, M)$ in accordance with Equation (24) given earlier.

On the other hand, if the processing unit 6 proceeds from S1204 to directly to step S1206, the processing unit 6 sets an angle value (for example $\theta(j_G, i_G M) = 2000$) for determination indicating that the point corresponding to the currently selected grid point on the gear tooth surface 102G exists outside the pinion tooth surface 102P.

When the subroutine shown in FIG. 17 starts, the processing unit 6 performs operations at steps S1301 to S1306 that are similar to the operations at steps S301 to S306 described with respect to the first embodiment.

Then the processing unit 6 proceeds from step S1302 to S1307, where the processing unit 6 sets the gear rotation step count M to 1. Then, at step S1308, the processing unit 6 determines whether the gear rotation step count M has reached the maximum gear rotation step count $M_{max}$.

If the processing unit 6 determines at step S1308 that the gear rotation step count M has not reached the maximum gear rotation step count $M_{max}$, the processing unit proceeds to step S1309. On the other hand, if the processing unit 6 determines that the gear rotation step count M has reached the maximum gear rotation step count $M_{max}$, the processing unit 6 proceeds to step S1312.

When the processing unit 6 proceeds from step S1308 to step S1309, the processing unit 6 calculates the minimum inter-tooth-surface angle $\theta_{Mmin}(M)$ in multiple-tooth meshing at the gear rotation step count M by using Equation (38) given below.

$$\theta_{Mmin}(M) = \min(\theta_{Mmin}(M + k + OPN)) \tag{38}$$

In equation (38), OPN is the number of angle steps per meshing pitch.

k is the number of the tooth preceding or succeeding the current tooth of interest, which is an integer that satisfies equation (39) given below.

$$int((1-M)/OPN) - 1 \leq k \leq int(M_{max} - M) + 1 \tag{39}$$

where "int" is a soft function for dropping the fractional portion of the number in the parentheses.

The processing unit 6 proceeds from step S1309 to step S1310, where the processing unit 6 calculates a transmission error MCS (M) in single-tooth meshing at the current gear rotation step count M and a transmission error MCM (M) in multiple-tooth meshing at the current gear rotation step count M by using Equations (40) and (41) given below, respectively.

$$MCS(M) = \theta_{Smin}(M) - \theta_{minmin} \tag{40}$$

$$MCM(M) = \theta_{Mmin}(M) - \theta_{minmin} \tag{41}$$

The processing unit 6 increments the gear rotation step count M (M=M+1) at step S1311 and then returns to step S1308.

When the processing unit 6 proceeds from step S1308 to S1312, the processing unit 6 uses the transmission errors MCM (M) at the gear rotation step counts M obtained in the process described above to calculate the range of variation ME in transmission error in multiple-tooth meshing from the start of the meshing between the gear tooth surface 102G and the pinion tooth surface 102P to the end of the meshing in accordance with Equation (42) given below.

$$ME = \max(MCM(M)) - \min(MCM(M)) \tag{42}$$

From the result of the calculation, a characteristic diagram representing a transmission error in multiple-tooth meshing between the gear tooth surface 102G and the pinion tooth surface 102P as shown in FIG. 19, for example, can be obtained. The alternate long and short dash line in FIG. 19 represents a characteristic of a transmission error in single-tooth meshing.

When the processing unit 6 proceeds from step S1312 to S1313, the processing unit 6 performs operations from step S1313 to S1318, which are similar to the operations from step S307 to S312 described with respect to the first embodiment, to calculate ease-off data $\theta_{EO}(j_G, i_G)$ which is an angle value at each grid point $(j_G, i_G)$ on the gear tooth surface 102G representing a relative gap distance between a pair of gear tooth surface 102G and pinion tooth surface 102P rotating at the ratio of the numbers of teeth from the start of meshing between the gear tooth surface 102G and the pinion tooth surface 102P to the end of the meshing. In accordance with the ease-off data, the processing unit 6 calculates relative tooth data $\theta_{MCP}(j_G, i_G)$ in multiple-tooth meshing.

Specifically, the processing unit 6 sets the gear rotation step count M to 1 at step S1313. Then, the processing unit 6 determines at step S1314 whether the gear rotation step count M has reached the maximum gear rotation step count $M_{max}$.

If the processing unit 6 determines at step S1314 that the gear rotation step count M has not reached the maximum gear rotation step count $M_{max}$, the processing unit 6 proceeds to step S1315. On the other hand, if the processing unit 6 determines that the gear rotation step count M has reached the maximum gear rotation step count $M_{max}$, the processing unit 6 proceeds to step S1319.

When the processing unit 6 proceeds from step S1314 to S1315, the processing unit 6 determines whether the calculation of relative tooth data $\theta_{EOM}(j_G, i_G, M)$ in single-tooth meshing and relative tooth data $\theta_{MCPM}(j_G, i_G, M)$ in multiple-tooth meshing has been completed for all grid points $(j_G, i_G)$ on the gear tooth surface 102G at the current gear rotation step count M.

If the processing unit 6 determines at step S1315 that calculation of relative tooth data $\theta_{EOM}(j_G, i_G, M)$ and relative tooth data $\theta_{MCPM}(j_G, i_G, M)$ for all grid points $(j_G, i_G)$ has not yet been completed, the processing unit 6 proceeds to step S1316, where the processing unit 6 calculates relative tooth data $\theta_{EOM}$ with respect to the minimum inter-tooth-surface angle $\theta_{minmin}$ in accordance with Equation (27) given above and relative tooth data $\theta_{MCPM}$ with respect to the minimum inter-tooth-surface angle $\theta_{Mmin}(M)$ at each step in multiple-tooth meshing in accordance with Equation (43) given below.

$$\theta_{MCPM}(j_G, i_G, M) = (j_G, i_G, M) - \theta_{Mmin}(M) \tag{43}$$

Then, at step S1317, the processing unit 6 uses the relative tooth data $\theta_{EOM}(j_G, i_G, M)$ and relative tooth data $\theta_{MCPM}(j_G, i_G, M)$ at the currently selected grid point $(j_G, i_G)$ to update the corresponding ease-off data $\theta_{EO}(j_G, i_G)$ and contact pattern data $\theta_{MCP}(j_G, i_G)$ in accordance with Equation (28) given above and Equation (44) given below as appropriate, and then returns to step S1315.

$$\theta_{MCP}(j_G, i_G) = \min(\theta_{MCPM}(j_G, i_G, M)) \quad (44)$$

On the other hand, if the processing unit 6 determines at step S1315 that calculation of data $\theta_{EOM}(j_G, i_G, M)$ and $\Theta_{MCPM}(j_G, i_G, M)$ for all grid points $(j_G, i_G)$ at the current gear rotation step count M has been completed, the processing unit 6 proceeds to step S1318, where the processing unit 6 increments the gear rotation step count M(M=M+1) and then returns to step S1314.

When the processing unit 6 proceeds from step S1314 to step S1319, the processing unit 6 converts the relative tooth data $\theta EO(j_G, i_G)$ and $\theta_{MCP}(j_G, i_G)$ at each grid point $(j_G, i_G)$ on the gear tooth surface 102G in single-tooth meshing and multiple-tooth meshing into distance information (ease-off data $EO(j_G, i_G)$ and tooth contact distribution data $MCP(j_G, i_G)$ in the whole meshing area) in accordance with Equation (29) given above and Equation (45) given below. Then the processing unit 6 exits the subroutine and returns to the main routine.

$$MCP(j_G, i_G) = \theta_{MCP}(j_G, i_G) \cdot r_0(j_G, i_G) \quad (45)$$

As a result, enveloping surfaces are generated that are combinations of the relative tooth at the individual gear rotation step counts M in meshing of a single pair of tooth surfaces rotating at the ratio of the numbers of teeth and meshing of multiple tooth surfaces moving at an operational rotation angle. From the enveloping surface generated from the multiple-tooth meshing, the area of tooth contact between the gear and the pinion and the locus of the contact point can be obtained as shown in FIG. 18.

The embodiment described above provides the effect of significantly reducing the amount of calculation of the gaps between tooth surfaces, in addition to the effects provided by the first embodiment described earlier.

Furthermore, more practical evaluation of a gear pair can be performed by calculating data such as the area of tooth contact between a gear and a pinion, the locus of the contact point, and transmission errors.

The method of calculation such as the inter-tooth-surface gap calculation is not limited to those given in the embodiments. Other calculation methods that use a cylindrical coordinate system may be used, of course. Furthermore, it will be understood that any configurations of the embodiments described above may be combined as appropriate.

The invention claimed is:

1. A gear pair evaluation apparatus comprising:
   coordinate converting means for associating, at a predetermined meshing rotational position, three-dimensional coordinate data on an orthogonal coordinate system measured at a set of measurement points on a tooth surface of a first gear with three-dimensional coordinate data on an orthogonal coordinate system measured at a set of measurement points on a tooth surface of a second gear that meshes with the first gear by using an assembly specification of the gear pair and converting the three-dimensional coordinate data into three-dimensional coordinate data on a cylindrical coordinate system based on the first gear;
   function generating means for generating a function representing the path of a point on a tooth surface of the second gear on the basis of the three dimensional coordinate data on a tooth surface of the second gear;
   inter-tooth-surface gap information calculating means for calculating, by using the function, relative angle information representing a gap between a point on a tooth surface of the first gear and a point on a tooth surface of the second gear that exists on the same circumference on which the point on the tooth surface of the first gear exists on the cylindrical coordinate system and corresponds to the point; and
   enveloping surface calculating means for extracting the smallest relative angle information from the relative angle information calculated at each meshing rotational position at which the first and second gears mesh with each other and calculating a three-dimensional enveloping surface representing a relative gap distance between a tooth surface of the first gear and a tooth surface of the second gear from the start of meshing between the first and second gears to the end of the meshing with respect to the extracted minimum relative angle information on the basis of the relative angle information.

2. The gear pair evaluation apparatus according to claim 1, wherein the coordinate converting means corrects the pieces of three-dimensional coordinate data associated with each other using the assembly specification of the gear pair by using a deflection value of the gear pair.

3. The gear pair evaluation apparatus according to claim 1, wherein the enveloping surface calculating means extracts, as an apex of the gear pair, a point on the enveloping surface that corresponds to the extracted minimum relative angle information.

4. The gear pair evaluation apparatus according to claim 1, wherein the enveloping surface calculating means converts information on the calculated three-dimensional enveloping surface into two-dimensional contour information.

5. The gear pair evaluation apparatus according to claim 1, wherein the function generating means generates a function of radius coordinates, a function of axis coordinates, and a function of angle coordinates that represent the path of a point on a tooth surface of the second gear on the basis of the three-dimensional coordinate data on the tooth surface of the second gear by using a two-dimensional parameter set on the tooth surface of the second gear; and
   the inter-tooth-surface gap information calculating means calculates the parameter representing a point on a tooth surface of the second gear that exists on the same circumference on which the path of a point on a tooth surface of the first gear exists on the cylindrical coordinate system from the function of the radius coordinates and the function of the axis coordinates and calculates relative angle information representing a gap between a point on a tooth surface of the first gear and a point on a tooth surface of the second gear that corresponds to the point on the tooth surface of the first gear on the basis of the calculated parameter by using the function of the angle coordinates.

6. The gear pair evaluation apparatus according to claim 1, wherein the function generating means is set by a flat surface equation that approximates a tooth surface on the basis of a combination of three adjacent grid points on the basis of coordinate data of each grid point on a second tooth surface.

7. A gear pair evaluation program stored on computer readable medium for execution by a computer comprising:
   a coordinate converting step of associating, at a predetermined meshing rotational position, three-dimensional coordinate data measured at a set of measurement points on a tooth surface of a first gear with three-dimensional coordinate data measured at a set of measurement points on a tooth surface of a second gear that meshes with the first gear by using an assembly specification of the gear pair and converting the three-dimensional coordinate data into three-dimensional coordinate data on a cylindrical coordinate system based on the first gear;
a function generating step of generating a function representing the path of a point on a tooth surface of the second gear on the basis of the three dimensional coordinate data on a tooth surface of the second gear;
an inter-tooth-surface gap information calculating step of calculating, by using the function, relative angle information representing a gap between a point on a tooth surface of the first gear and a point on a tooth surface of the second gear that exists on the same circumference on which the point on the tooth surface of the first gear exists on the cylindrical coordinate system and corresponds to the point; and
an enveloping surface calculating step for extracting the smallest relative angle information from the relative angle information calculated at each meshing rotational position at which the first and second nears mesh with each other and calculating a three-dimensional enveloping surface representing a relative gap distance between a tooth surface of the first gear and a tooth surface of the second gear from the start of meshing between the first and second gears to the end of the meshing with respect to the extracted minimum relative angle information on the basis of the relative angle information.

8. The gear pair evaluation apparatus according to claim 1, further comprising a processing unit, wherein the processing unit calculates a division number per pitch of the second gear and a rotation angle of the second gear per step.

9. The gear pair evaluation apparatus according to claim 8, wherein the processing unit calculates rotation angles of the first gear and the second gear that correspond to a current gear rotation step and repeats the calculation till a gear rotation step count reaches a maximum gear rotation step count.

10. The gear pair evaluation apparatus according to claim 9, wherein the processing unit moves coordinates grid points on the orthogonal coordinate system of the first gear and the second gear respectively related to the rotation angles.

11. The gear pair evaluation apparatus according to claim 10, wherein the processing unit converts a coordinate data of the grid points on the second gear tooth surface at a current step rotational position into coordinate data on the orthogonal coordinate system of the first gear.

12. The gear pair evaluation apparatus according to claim 2, comprising enveloping surface calculating means for extracting the smallest relative angle information from the relative angle information calculated at each meshing rotational position at which the first and second gears mesh with each other and calculating a three-dimensional enveloping surface representing a relative gap distance between a tooth surface of the first gear and a tooth surface of the second gear from the start of meshing between the first and second gears to the end of the meshing with respect to the extracted minimum relative angle information on the basis of the relative angle information.

13. The gear pair evaluation apparatus according to claim 3, wherein the enveloping surface calculating means converts information on the calculated three-dimensional enveloping surface into two-dimensional contour information.

14. The gear pair evaluation apparatus according to claim 2, wherein the function generating means generates a function of radius coordinates, a function of axis coordinates, and a function of angle coordinates that represent the path of a point on a tooth surface of the second gear on the basis of the thee-dimensional coordinate data on the tooth surface of the second gear by using a two-dimensional parameter set on the tooth surface of the second gear; and
the inter-tooth-surface gap information calculating means calculates the parameter representing a point on a tooth surface of the second gear that exists on the same circumference on which the path of a point on a tooth surface of the first gear exists on the cylindrical coordinate system from the function of the radius coordinates and the function of the axis coordinates and calculates relative angle information representing a gap between a point on a tooth surface of the first gear and a point on a tooth surface of the second gear that corresponds to the point on the tooth surface of the first gear on the basis of the calculated parameter by using the function of the angle coordinates.

15. The gear pair evaluation apparatus according to claim 1, wherein the function generating means generates a function of radius coordinates, a function of axis coordinates, and a function of angle coordinates that represent the path of a point on a tooth surface of the second gear on the basis of the three-dimensional coordinate data on the tooth surface of the second gear by using a two-dimensional parameter set on the tooth surface of the second gear; and
the inter-tooth-surface gap information calculating means calculates the parameter representing a point on a tooth surface of the second gear that exists on the same circumference on which the path of a point on a tooth surface of the first gear exists on the cylindrical coordinate system from the function of the radius coordinates and the function of the axis coordinates and calculates relative angle information representing a gap between a point on a tooth surface of the first gear and a point on a tooth surface of the second gear that corresponds to the point on the tooth surface of the first gear on the basis of the calculated parameter by using the function of the angle coordinates.

16. The gear pair evaluation apparatus according to claim 3, wherein the function generating means generates a function of radius coordinates, a function of axis coordinates, and a function of angle coordinates that represent the path of a point on a tooth surface of the second gear on the basis of the three-dimensional coordinate data on the tooth surface of the second gear by using a two-dimensional parameter set on the tooth surface of the second gear; and
the inter-tooth-surface gap information calculating means calculates the parameter representing a point on a tooth surface of the second gear that exists on the same circumference on which the path of a point on a tooth surface of the first gear exists on the cylindrical coordinate system from the function of the radius coordinates and the function of the axis coordinates and calculates relative angle information representing a gap between a point on a tooth surface of the first gear and a point on a tooth surface of the second gear that corresponds to the point on the tooth surface of the first gear on the basis of the calculated parameter by using the function of the angle coordinates.

17. The gear pair evaluation gear pair evaluation program of claim 7 further comprising
an output step for outputting to a display data as to the gap information calculated in the information calculation step as to provide gear pair information useful for tooth surface analysis by a user.

18. A gear pair evaluation method, comprising:
conducting a coordinate converting step of associating, at a predetermined meshing rotational position, three-dimensional coordinate data measured at a set of measurement points on a tooth surface of a first gear of a gear pair with three-dimensional coordinate data measured at a set of measurement points on a tooth surface of a second gear of the gear pair that meshes with the first gear by using an assembly specification of the gear pair and converting the three-dimensional coordinate data into three-dimensional coordinate data on a cylindrical coordinate system based on the first gear;

a function generating step of generating a function representing the path of a point on a tooth surface of the second gear on the basis of the three dimensional coordinate data on a tooth surface of the second gear;

an inter-tooth-surface gap information calculating step of calculating, by using the function, relative angle information representing a gap between a point on a tooth surface of the first gear and a point on a tooth surface of the second gear that exists on the same circumference on which the point on the tooth surface of the first gear exists on the cylindrical coordinate system and corresponds to the point; and an enveloping surface calculating step for extracting the smallest relative angle information from the relative angle information calculated at each meshing rotational position at which the first and second gears mesh with each other and calculating a three-dimensional enveloping surface representing a relative gap distance between a tooth surface of the first gear and a tooth surface of the second gear from the start of meshing between the first and second gears to the end of the meshing with respect to the extracted minimum relative angle information on the basis of the relative angle information.

19. The gear pair evaluation method according to claim 18, further comprising providing a gear pair for evaluation and wherein in the function generating step there is generated a set of radius coordinates, a set of axis coordinates, and a set of angle coordinates that represent the path of a point on a tooth surface of the second gear on the basis of the three-dimensional coordinate data on the tooth surface of the second gear by using a two-dimensional parameter set on the tooth surface of the second gear; and wherein in the inter-tooth-surface gap information calculating step there is calculated a parameter representing a point on a tooth surface of the second gear that exists on the same circumference on which the path of a point on a tooth surface of the first gear exists on the cylindrical coordinate system from the function of the radius coordinates and the function of the axis coordinates and there is further calculated relative angle information representing a gap between a point on a tooth surface of the first gear and a point on a tooth surface of the second gear that corresponds to the point on the tooth surface of the first gear on the basis of the calculated parameter by using the function of the angle coordinates; and outputting to a display data based on the gap information calculated in the information calculation step as to provide gear pair information useful for tooth surface analysis by a user.

* * * * *